US008475273B2

(12) United States Patent
Kelly et al.

(10) Patent No.: US 8,475,273 B2
(45) Date of Patent: Jul. 2, 2013

(54) VIDEO SWITCHER AND TOUCH ROUTER SYSTEM FOR A GAMING MACHINE

(75) Inventors: Bryan M. Kelly, Alamo, CA (US); Stephen Pallon, Reno, NV (US); Kiran Brahmandam, Fremont, CA (US); Robert W. Crowder, Jr., Las Vegas, NV (US); Vijay Kompella, Las Vegas, NV (US); Jeffrey Lee Allen, Pleasanton, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 533 days.

(21) Appl. No.: 12/350,939

(22) Filed: Jan. 8, 2009

(65) Prior Publication Data

US 2009/0149254 A1 Jun. 11, 2009

Related U.S. Application Data

(63) Continuation-in-part of application No. 11/470,606, filed on Sep. 6, 2006, and a continuation-in-part of application No. 11/938,746, filed on Nov. 12, 2007.

(60) Provisional application No. 61/019,824, filed on Jan. 8, 2008, provisional application No. 60/714,754, filed on Sep. 7, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .............................................. 463/36; 463/40

(58) Field of Classification Search
USPC ................ 463/30, 31, 33, 34, 37, 40, 16, 20, 463/42
See application file for complete search history.

(56) References Cited

U.S. PATENT DOCUMENTS

| | | | | |
|---|---|---|---|---|
| 4,710,758 | A | 12/1987 | Mussler et al. | |
| 5,412,404 | A | 5/1995 | Candy | |
| 5,580,310 | A | 12/1996 | Orus et al. | |
| 5,908,354 | A | 6/1999 | Okuniewicz | |
| 6,012,832 | A | 1/2000 | Saunders et al. | |
| 6,379,246 | B1 | 4/2002 | Dabrowski | |
| 6,652,378 | B2 * | 11/2003 | Cannon et al. | 463/20 |

(Continued)

*Primary Examiner* — Jarrett Stark
(74) *Attorney, Agent, or Firm* — Brooke Quist; Marvin Hein

(57) ABSTRACT

A Display Manager is placed between the Master Gaming Controller and its Main Game Display and any Secondary Display and between the Player Tracking Unit connected to the casino system network (e.g., player tracking device) and its System display. The Display Manager receives one or more video signals from the Master Gaming Controller and one or more video signals from the system device and displays one or multiple video signals on one or more shared displays. One of the video signals may be presented alone on one of the displays, with the other signal absent from that shared display, or multiple signals may be simultaneously displayed on one of the shared displays. The screen may be split between multiple signals, or one or more signals may overlay one or more background signals. The overlaid signals may completely obscure the background signals, or they may provide a level of transparency by allowing the background signal to be partially or completely visible. Also, the overlaid signal may provide different levels of transparency in different areas of the display, effectively superimposing an image on top of the background signal. The Display Manager receives commands from a device, directing it how to split, overlay, superimpose, and otherwise share the display among the video input signals.

29 Claims, 26 Drawing Sheets

U.S. PATENT DOCUMENTS 7,335,106 B2 2/2008 Johnson
7,749,081 B1 * 7/2010 Acres .............................. 463/31
7,871,325 B2 1/2011 Okuniewicz
7,922,577 B2 4/2011 Okuniewicz
8,083,592 B2 12/2011 Wells
8,088,014 B2 1/2012 Wells
8,133,102 B2 3/2012 Dabrowski
2005/0020358 A1 * 1/2005 Cram .............................. 463/31
2007/0243934 A1 10/2007 Little et al.
2008/0113773 A1 5/2008 Johnson et al.
2009/0149253 A1 6/2009 Kelly et al.
2009/0149254 A1 6/2009 Kelly et al.
2009/0258697 A1 10/2009 Kelly et al.

* cited by examiner

VIDEO SWITCHER AND TOUCH ROUTER SYSTEM FOR A GAMING MACHINE

CROSS-REFERENCE TO RELATED APPLICATIONS

This application claims the benefit of U.S. provisional Patent Application Ser. No. 61/019,082, filed Jan. 8, 2008, which is hereby incorporated herein by reference. This application is also a continuation-in-part of U.S. patent application Ser. No. 11/470,606, filed Sep. 6, 2006, which claims the benefit of U.S. provisional Patent Application Ser. No. 60/714,754, filed Sep. 7, 2005, both of which are hereby incorporated by reference in its entirety. This application is also a continuation-in-part of U.S. patent application Ser. No. 11/938,746, filed Nov. 12, 2007, which is hereby incorporated by reference herein in their entirety. This application is also related to U.S. patent application Ser. No. 11/307,528, filed Feb. 10, 2006, which is hereby incorporated herein by reference. This application is related to copending U.S. patent application Ser. No. 12/350,938, filed Jan. 8, 2009, entitled VIDEO SWITCHER AND TOUCH ROUTER METHOD FOR A GAMING MACHINE, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The disclosed embodiments relate generally to combining gaming and casino system information on to one or more shared touch displays while maintaining a physical separation between gaming equipment and casino system-related associated equipment.

BACKGROUND

Providing Picture-in-Picture (PIP) features and multi-framed screens have been implemented on gaming machines. This typically has been achieved by programming screen real estate segmentation into a controlling software application and a process running on a single or multi-core CPU to specifically draw the output into each frame. The drawing software may be accomplished by rendering streaming media sourced from a local or network media service (e.g., Adobe Flash Server, Windows Media Server), by rendering marked-up commands (e.g., HTML) served up from a local or remote web service, or by direct programmatic manipulation of graphics.

Traditionally, wagering-related game presentations (spinning reels or video games) on an electronic gaming machine is presented on one or more video displays. One of these displays, called the Main Game Display, is usually positioned directly in front of and within arms reach of the casino patron seated in front of the machine, providing optimal viewing and physically interacting with the electronic gaming machine. System information, on the other hand, has traditionally been presented via a separate stand-alone display, called a System Display or iVIEW, usually much smaller in size, located above, below, or to the side of the Main Game Display. System information traditionally displayed has included the patron's name, loyalty club information, casino marketing messages, and interaction with secondary marketing promotions, bonus games, sweepstakes, and tournaments. This System Display generally is a separate, small, multi-line text or LCD graphical display. In both cases, it is not optimally positioned for either capturing the patron's attention or for viewing in general.

A need exists to enhance the patron's overall gaming experience by presenting key system information at a location optimized for notification and viewing by the player. An ideal location would be on the Main Game Display since all gaming cabinets are designed with this display placed for optimal interaction with the wagering game, including bar top, slant top, and upright-style electronic gaming cabinets.

Many secondary displays on a gaming machine are underutilized. Many are used simply as static electronic glass. Others provide a secondary display for displaying bonus games or progressive meters in conjunction with the wagering game on that cabinet while a patron is wagering on the device. A need exists to more effectively utilize this secondary display, especially when no one is actively wagering on the gaming machine by displaying casino specific messages, for example, advertising the specific game, casino events and promotions, responsible gaming messages, or other types of advertisements and messages. It would be advantageous to display these messages located for optimal viewing by patrons in the vicinity of the electronic gaming machine, not just sitting in front of the machine. For many electronic cabinet styles, this would be the secondary display often located above the Main Game Display.

Currently, a separate screen is used to display system information while maintaining a separation between the gaming machine with one or more master gaming controllers from the associated equipment player tracking device. A need exists to reduce costs by eliminating the separate display used for system information. It would be advantageous to display both wagering game and system information on the same display.

Also currently, system information is streamed or otherwise communicated through TCP/IP, serial ports, USB, and other methods to a software component running on the master gaming controller that renders the content and manages the interactivity with the patron, for example, touches. This exposes the master gaming controller to aberrant and malicious software compromising the integrity of the wagering game. Further, substandard and poorly implemented software consumes more than its share of resources and affects the performance and function of the wagering game. Therefore, a need exists for the wagering gaming device and the software, that renders the system information to be separated and protected from each other.

Where system information is rendered through software components running on the master gaming controller, the operating software must be designed in such a way to ensure the integrity of the wagering game software is also running on the master gaming controller. As a result, when new system-only capabilities are needed, such as a new biometric camera, which do not directly affect or are directly used by the wagering game, each game manufacturer must update their operating system software to support such features and new devices. This results in slower time to market for such features since each manufacturer must have their platform approved by regulators. This further results in inconsistency across a given casino floor since manufacturers employ different schedules for implementation. Accordingly, a need exists to share the touch displays with no changes being required in the wagering game software, or game operating system, or any other software running on the master game controller.

Furthermore, a need exists to employ shared wagering game and system touch displays on legacy electronic gaming machines without affecting the performance of either the wagering game or the system content. Updates to system-driven content will not touch the regulated gaming software. Also, a need exists to employ shared wagering game and system touch displays with a consistent experience. It would be advantageous for the customer experience to be consistent on all electronic gaming machines across all manufacturers, and across all games and computer hardware configurations on a casino floor. There exists a need to maintain the well-defined separation between regulated gaming equipment and associated equipment.

A need also exists to allow patrons to interact with the gaming machine based on what is shown on the shared displays. The patron's touches must be sent to the correct source of what is being shown on the shared display at the point where the patron touched. It would be advantageous to process and route the touches with no changes being required in the wagering game software or game operating system or any other software running on the master game controller.

SUMMARY

In accordance with one or more embodiments, a Video Switching Device ("VSD") is placed between the master gaming controller and its main game display and any Secondary Displays. Specifically, a system gaming/player tracking device, which by switching (e.g., arbitrating, redistributing, or the like) video output from one or more master gaming controllers and/or one or more associated equipment devices, displays the resulting video output to one or more video displays associated physically or logically with an electronic gaming machine (EGM). Preferably, the video switching is controlled by the associated equipment device that is connected to backend casino systems or controlled by central configuration servers over Ethernet. User inputs (e.g., via touch, or other coordinate input devices based on the geometry of the video display) are received by the touch de-multiplexer and routed to the appropriate master gaming controller or associated equipment device, scaled appropriately, as determined by a video output window the user was interacting with on the shared touch display.

The VSD is also located between the associated equipment device connected to the casino system network (e.g., player tracking device) and its System Display. In one embodiment, the VSD is a separate hardware device with multiple video input ports and a controller port. The VSD receives one or more video signals from the master gaming controller and one or more video signals from the system device and displays one or multiple video signals on one or more shared displays. The video signal inputs and outputs may be 9-pin Video Graphics Array (VGA), 15-pin Super VGA, Low-voltage differential signalling (LVDS), Digital Visual Interface (DVI), HDMI, or any combination thereof. The controller port may be RS-232 Serial, USB, Ethernet, and the like. One video signal may be presented alone on one of the displays, with the other signal absent from that shared display, or multiple signals may be simultaneously displayed on one of the shared displays.

The screen may be split between multiple signals, or one or more signals may overlay one or more background signals. The overlaid signal(s) may completely obscure the background signal(s) or may provide a level of transparency by allowing the background signal to be partially or completely visible. Also, the overlaid signal may provide different levels of transparency in different areas of the display, effectively superimposing an image on top of the background signal. The VSD receives commands from a device or server via Ethernet connection, preferably a player tracking device (an associated equipment device) directing the VSD to split, overlay, superimpose, and otherwise share the display among the video input signals. This VSD enables the wagering game running on the master gaming controller and the system information rendering software to remain completely independent of each other, executing on single or multi-core CPU's located on completely separate electronic devices.

In accordance with one or more embodiments, a Touch Router Device ("TRD") receives touch signals from micro-controllers located on each of the touch displays, specifying the physical coordinates of a touch. The TRD determines the source of the video images displayed at the physical screen coordinates and calculates any coordinate transformation to accommodate any scaling or shifting performed on the video signal as it is mixed (e.g., switched, arbitrated, redistributed, or the like) for use on the display. The TRD then sends the relative coordinates (de-scaled and de-shifted) to the appropriate source device, a master gaming controller, or an associated equipment device, by mimicking the touch controller. This Video Switching/Touch Router Device enables the wagering game running on the master gaming controller and the system information rendering software to remain completely independent of each other, executing on single or multi-core CPU's located on completely separate electronic devices and shared touch displays.

In one embodiment, the TRD is a software component located on the player tracking device, i.e., an associated equipment device. The shared displays' touch controllers communicate with the player tracking device using RS-232 serial ports, USB ports (possibly utilizing a USB hub), a combination of the two, or conversion of one to another. The player tracking device's touch controller driver receives the touch signals from the microcontroller(s), converts their signals to physical coordinates, and provides the coordinates to the TRD, if the player tracking device is not the source of the video signal located at that physical coordinate. The TRD determines the video source, any scaling or shifting performed on the video signal, calculates the physical coordinates from a perspective of the video signal source device, and sends the touch micro-controller signals and commands to the touch device driver on the source device either through RS-232 serial ports or USB ports (possibly utilizing a USB hub), a combination of the two, or conversion of one to another.

Further aspects, features and advantages of various embodiments of the disclosed embodiments may be apparent from the following detailed disclosure, taken in conjunction with the accompanying sheets of drawings.

DETAILED DESCRIPTION

Various embodiments are directed to sharing touch displays between one or more Master Gaming Controllers and one or more associated equipment devices, (e.g., a player tracking unit) using a Video Switcher and Touch Router Device (sometimes referred to herein as a "Display Manager"), to enable system menus and other Picture-in-Picture applications to overlay the wagering game. Other embodiments may include sharing the display between one or more wagering games and one or more system marketing promotions, e.g., advertising, loyalty, customer-centric messages, video conferencing, and video-on-demand applications. Generally, the terms "mixing" and "re-rendering" (e.g., switching, arbitrating, redistributing, routing, or the like), and other forms of each, refer to original signals being passed through a switching device without any copying and/or saving of the signals or associated data. However, it will be appreciated by those skilled in the art that other embodiments may use any form of video signal processing herein.

Figure 1:
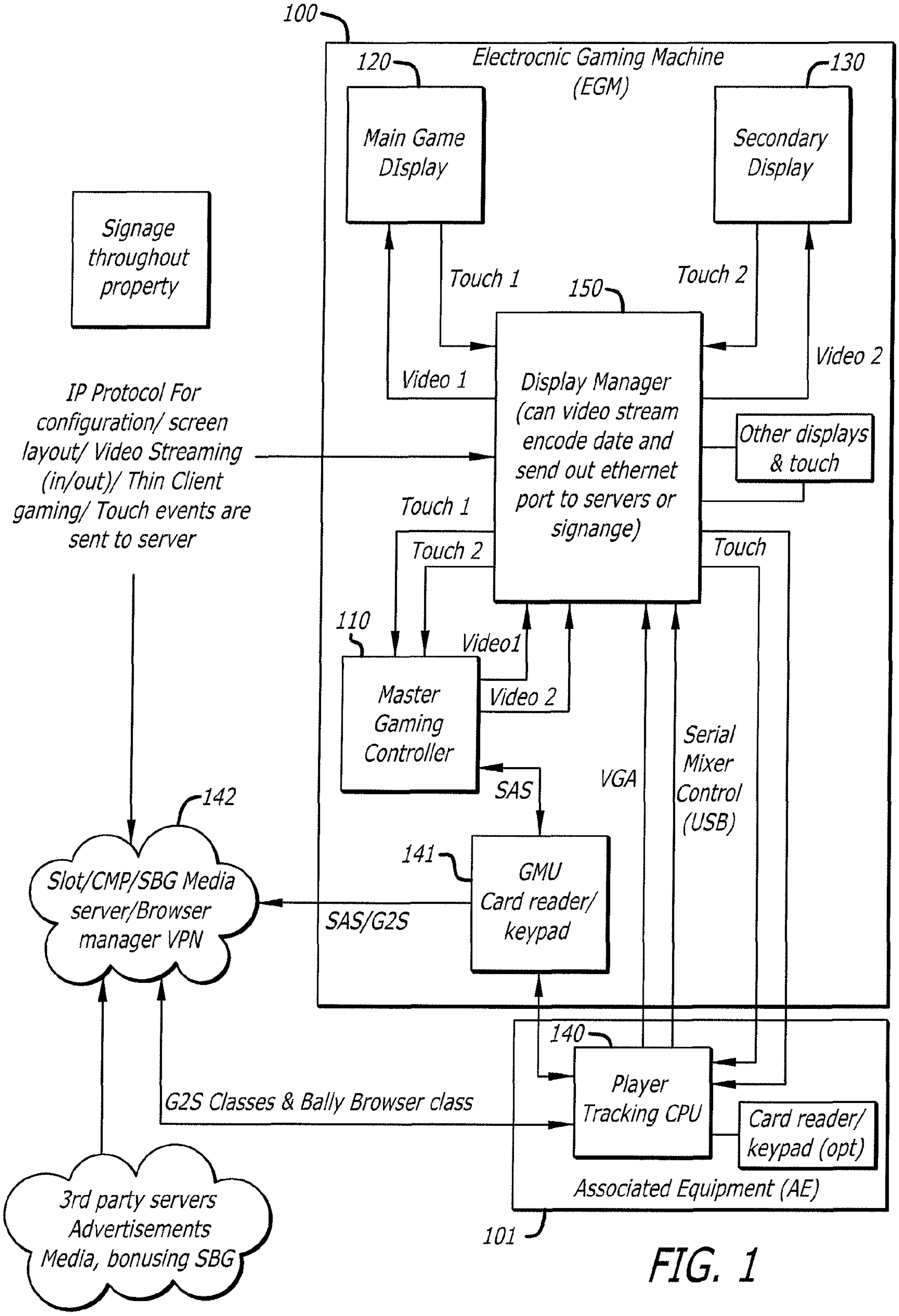
FIG. 1 is a component diagram of a Display Manager connected to components of an Electronic Gaming Machine and Player Tracking Device.

Referring to FIG. 1, a component diagram depicts a Display Manager 150 (i.e., Video Switcher/Touch Router Device) connected to main components of a gaming machine 100 and associated equipment. In one embodiment, the Display Manager 150 receives one or more video signals from a Master Gaming Controller 110 and Player Tracking Unit 140. The Display Manager 150 receives touch signals from touch screen controllers on a Main Game Display 120 and a Secondary Display 130, and routes the signals to the Master Gaming Controller 110 or Player Tracking Unit 140. In one embodiment, the Player Tracking Unit 140 communicates with the Master Gaming Controller 110 through a Game Monitoring Unit (GMU) 141. The GMU 141 provides a communication interface between the Master Gaming Controller 110 and a Slot Virtual Private Network to handle such things as slot accounting, and the like.

The Display Manager 200 has the ability to build a video stream from the VGA signals from the Master Gaming Controller 110 and/or Player Tracking Unit 140. This video stream may be then sent over Ethernet to a server, another gaming device, or to overhead signage. This allows the game presentation to be sent enterprise-wide for broadcast purposes. A non-limiting example is that a jackpot win may have the game screens sent to overhead LCD signs throughout the casino and on web portals. This creates the excitement for all players and not just the one who triggered the progressive. Also the Display Manager 200 may receive a video stream from a server and blend this video stream into one or more Picture-In-Picture ("PIP") window frames viewable on one or more LCD displays at the same time. Server executed games may be video streamed to this Display Manager 200 for presentation to the player. Player inputs from the button deck and touch screen may be sent to the Server-Based Game Engine (SBG) for processing. In some embodiments the Master Gaming Controller 110 is not needed to provide a thin-client gaming device. The only components needed are the Display Manager 150 and the peripheral controller. All RNG (Random Number Generator) game outcomes are determined and rendered on the servers. Even skill or skill predominate games may execute on the server and be presented to the user over this video stream.

Figure 2:
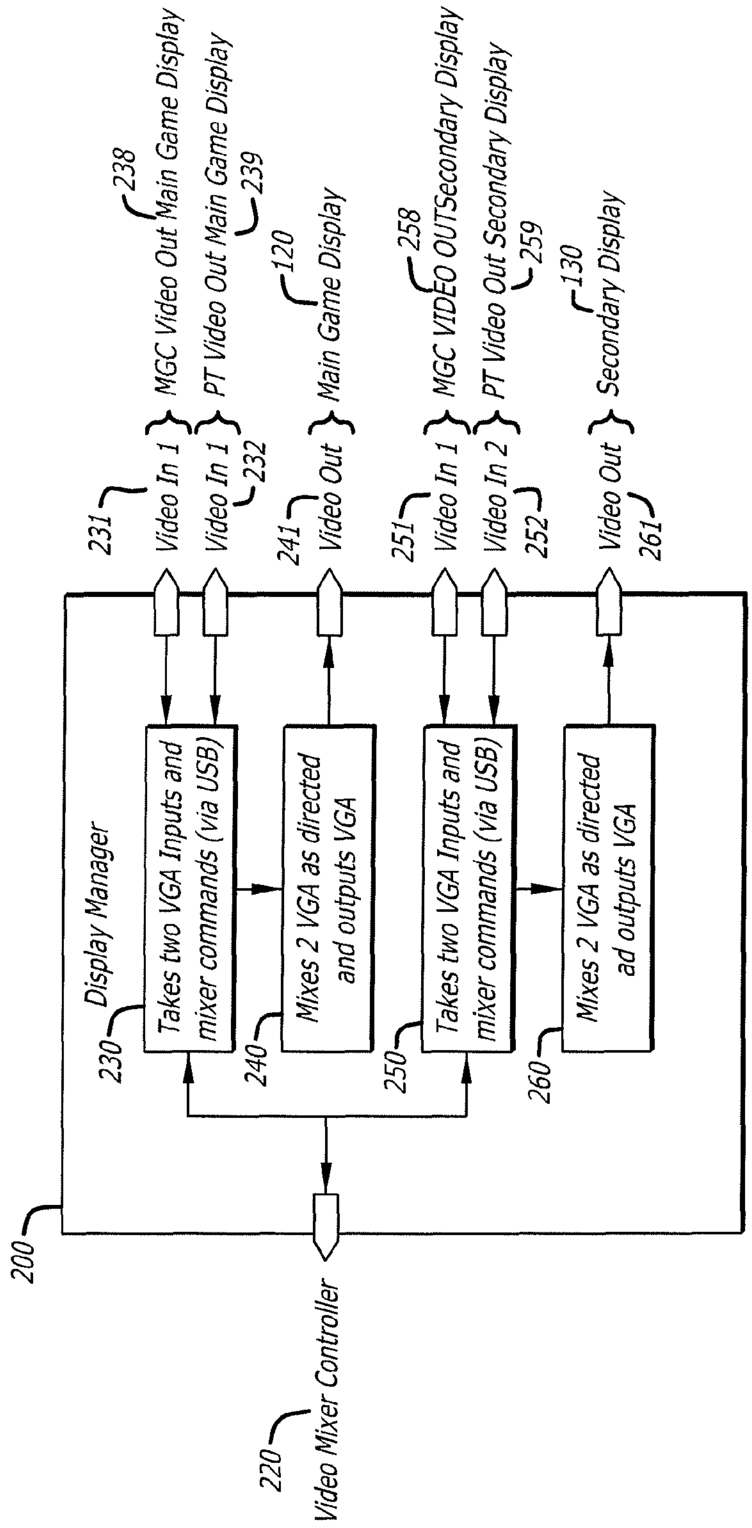
FIG. 2 is a component diagram of the components of the Display Manager.

The component diagram of FIG. 2 depicts a Display Manager 200 used for switching video signals and outputting the result to the Main Game Display 120 or Secondary Display 130. In a preferred embodiment, the Display Manager 200 has one or more video input ports 231 and 232 that receive video signals 230 intended for the Main Game Display 120, from a Master Gaming Controller video output 238 and Player Tracking Unit video output 239. The Display Manager receives instructions through a Video Switcher Controller port 220. Using the video signals, the Display Manager 200 mixes 240 (e.g., switches, arbitrates, redistributes, or the like) the video signals as directed by the commands coming in from the Video Mixer Controller 220 and outputs the result through a video-out port 241 that is connected to the video-in port on the Main Game Display 120.

In another embodiment, the Display Manager 200 also has one or more video input ports 251 and 252 that receive video signals 250 intended for the Secondary Display 130 from a Master Gaming Controller video output 258 and Player Tracking Unit video output 259. The Display Manager 200 receives instructions through the Video Mixer Controller 220. Using the video signals, the Display Manager 200 mixes 260 (e.g., switches, arbitrates, redistributes, or the like) the video signals as directed by the commands coming in from the Video Mixer Controller 220 and outputs the result through the video-out port 261 that is connected to the video-in port on the Secondary Display 130.

In one embodiment, these video input and output connections 231, 232, 241, 251, 252, and 261 are 15-pin Super Video Graphics Array ("SVGA"). In an alternative embodiment, these video connections may be 9-pin Video Graphics Array ("VGA"), 15-pin SVGA, Low-voltage differential signalling ("LVDS"), Digital Visual Interface ("DVI"), any other video signal connection, or any combination thereof. The Master Gaming Controller 110 may be transmitting one or more protocols such as, but not limited to:

| Name | x (width) | y (height) | Aspect Ratio |
|---|---|---|---|
| VGA | 640 | 480 | 4:3 |
| SVGA | 800 | 600 | 4:3 |
| XGA | 1024 | 768 | 4:3 |
| XGA+ | 1152 | 864 | 4:3 |
| SXGA | 1280 | 1024 | 5:4 |
| SXGA+ | 1400 | 1050 | 4:3 |
| UXGA | 1600 | 1200 | 4:3 |
| QXGA | 2048 | 1536 | 4:3 |
| WXGA* | 1366 | 768 | 16:9 |
| WXGA+* | 1440 | 900 | 16:10 |
| WSXGA* | 1600 | 1024 | 16:10 |
| WSXGA+ | 1680 | 1050 | 16:10 |
| WUXGA | 1920 | 1200 | 16:10 |
| WQXGA | 2560 | 1600 | 16:10 |

In one embodiment, the Video Mixer Controller 220 is a USB port. In an alternative embodiment, the port may be an RS-232 serial port or Ethernet port and connected to a server or other controller inside the gaming cabinet.

Figure 3A:
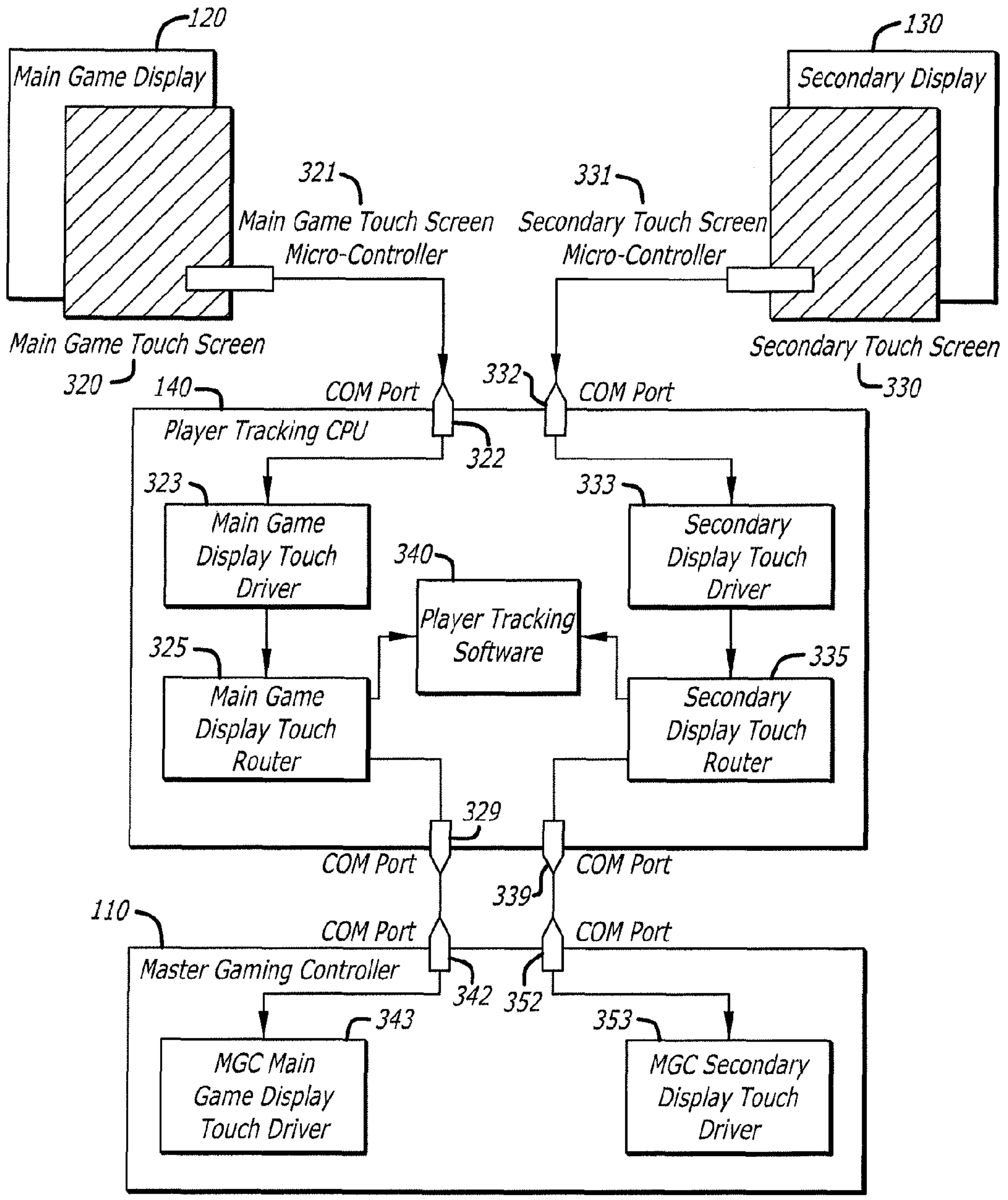
FIGS. 3A and 3B are component diagrams of the Touch Router.

Referring now to FIG. 3A, Touch Routers 325 and 335 are shown receiving touch signals from touch controllers 321 and 331 and routing the signals to the appropriate software applications. In one embodiment, the Touch Routers 325 and 335 are executed on the Player Tracking Unit 140. In this embodiment, the Main Game Display 120 is fitted with a Main Game Touch Screen 320. The Main Game Touch Screen is connected to the Main Game Touch Screen micro-controller 321. The micro-controller registers the touches by sending signals and commands to the Main Game Display Touch Driver 323 on the Player Tracking Unit 140. The micro-controller is connected to the Player Tracking Unit 140 via a COM port 322.

The Main Game Display Touch Driver 323 receives the micro-controller messages and commands and calculates the pixel coordinate of the touch and communicates these coordinates to the Main Game Display Touch Router 325. The Main Game Display Touch Router 325 determines if the touch occurred over the scaled and shifted video input from the Master Gaming Controller video input 231 or the Player Tracking Unit video input 232 to determine the proper destination to route the touch message. The touch message is either routed to the Player Tracking Software 340 or to the Main Game Display Touch Driver 343 on the Master Gaming Controller 110. The Player Tracking Unit 140 connects to the touch driver via a COM Port-Out 329 on the Player Tracking Unit connected to a COM Port-In 342 on the Master Gaming Controller 110.

In another embodiment, the system created content is rendered in an overlay window that occludes main game content. The non-remapped or scaled touch screen input data may be sent to both the Master Gaming Controller and the player tracking software and to the servers for processing. Otherwise stated, all applications receive all touch events, and each application processes these events in their own ways.

In another embodiment, the Secondary Display 130 is fitted with a Secondary Touch Screen 330. The Secondary Touch Screen is connected to the Secondary Touch Screen micro-controller 331. The micro-controller registers the touches by sending signals and commands to a Secondary Display Touch Driver 333 on the Player Tracking Unit 140. The micro-controller is connected to the Player Tracking Unit 140 via a COM port 332. The Secondary Display Touch Driver 333 receives the micro-controller messages and commands and calculates the pixel coordinate of the touch and communicates these coordinates to a Secondary Display Touch Router 335. The Secondary Display Touch Router determines if the touch occurred over the scaled and shifted video input from the video input 251 or the Player Tracking Unit video input 252 to determine the proper destination to route the touch message. The touch message is either routed to the Player Tracking Software 340 or to the Secondary Display Touch Driver 353 on the Master Gaming Controller 110. The Player Tracking Unit 140 connects to the touch driver via a COM Port-Out 339 on the Player Tracking Unit connected to a COM Port-In 352 on the Master Gaming Controller 110.

Figure 3B:
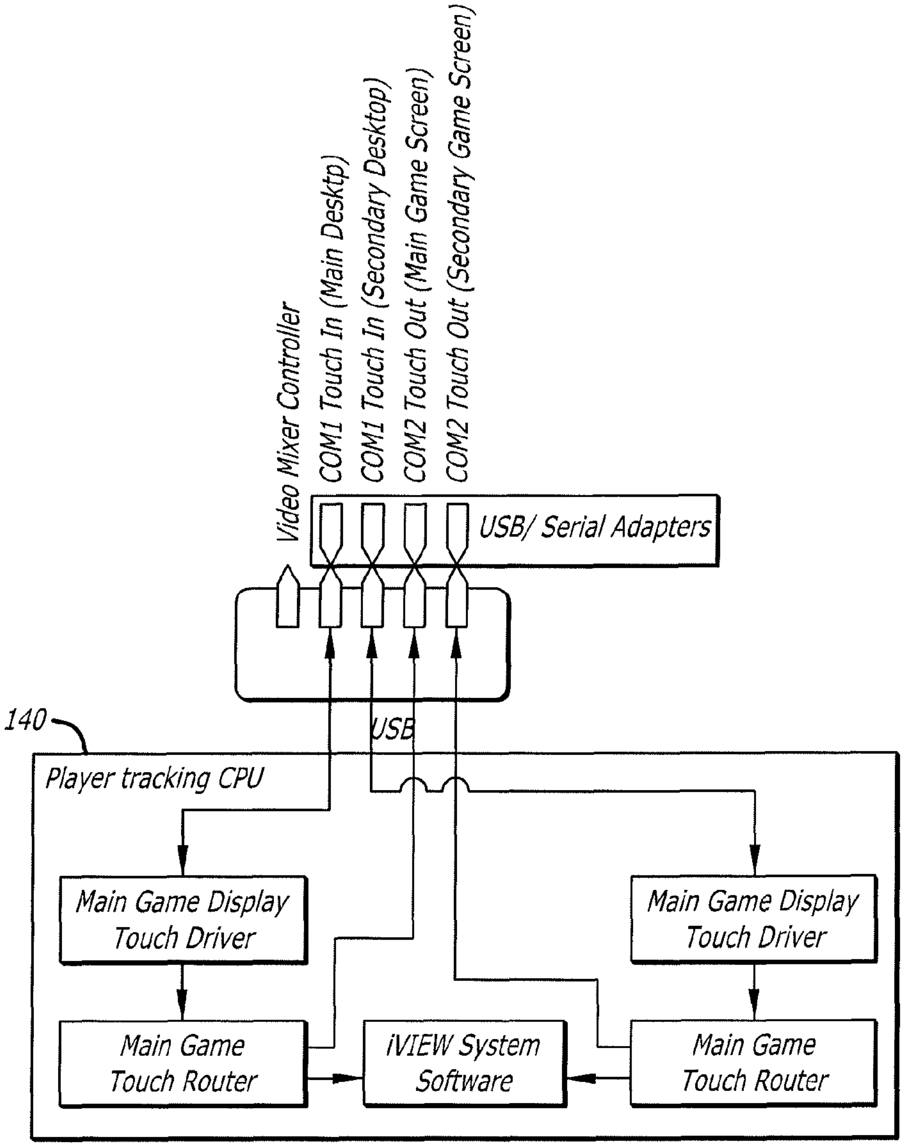

In one embodiment, the COM ports 322, 329, and 342 may be RS-232 serial ports. An alternative embodiment may use a USB port. Still another embodiment may use a combination of USB and serial ports, using USB-to-serial converters to allow RS-232 communications through USB ports. Those skilled in the art will appreciate that other ports may also be used, such as Ethernet, TCP/IP, and parallel ports. Referring to FIG. 3B, an embodiment is shown that utilizes a USB hub.

In still another embodiment, the Main Game Touch Screen 320 and the Secondary Touch Screen 330 use Sound Acoustic Wave technology to calculate the location of the touch. Alternative non-limiting embodiments may incorporate touch screens utilizing Resistive, Capacitive, Infrared, Strain Gauge, Optical Imaging, Dispersive Signal Technology, Acoustic Pulse Recognition, Frustrated Total Internal Reflection technologies, any multi-touch capable display technology, or any combination thereof.

Figure 4A:
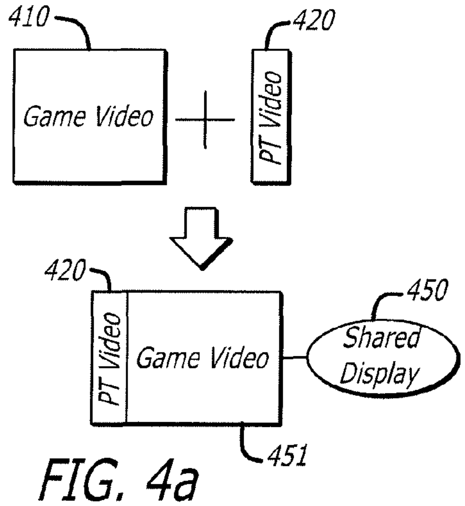
FIGS. 4A through 4C are diagrams of different screen splitting embodiments.
Figure 4B:
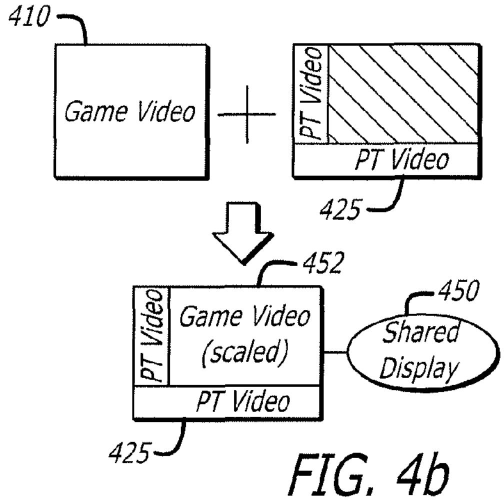
Figure 4C:
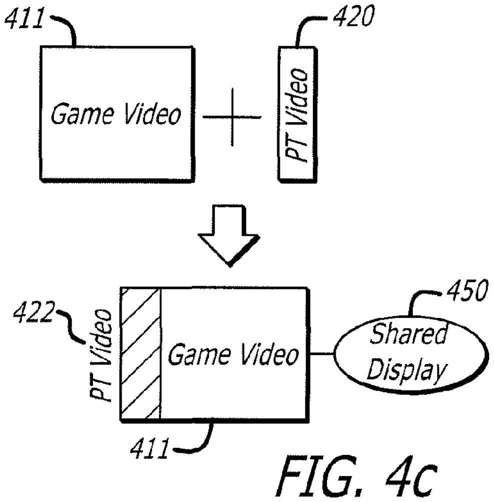

A series of diagrams are shown in FIGS. 4A through 4C demonstrating several methods of video switching of two video inputs 410 and 420 or 425, and displaying both simultaneously on a shared display 450. FIG. 4A demonstrates a split screen scenario. In one embodiment, the Display Manager 200 receives the Game Video 410 and Player Tracking Unit Video 420 and displays them side-by-side on a screen of the shared display. In a non-limiting embodiment, the Player Tracking Unit Video 420 is not scaled or shifted, but a resulting Game Video 451 has been scaled horizontally so that both video signals are displayed on the screen simultaneously. In another embodiment, the Player Tracking Unit Video is positioned towards the bottom of the display and scales the Game Video vertically. Still another embodiment scales both the Player Tracking Unit Video and the Game Video. Another alternate embodiment has a screen display that is larger and has a higher resolution than either the Game Display or Player Tracking Unit Display such that both video outputs may be displayed on a split screen without scaling either one.

Referring to FIG. 4B, a Picture-in-Picture scenario is demonstrated. In this embodiment, a screen layout of the Player Tracking Unit Video 425 is designed so that a space is reserved for overlaying the Game Video 410. The Display Manager 200 scales and shifts a resulting Game Video 452 so that it is positioned above the reserved area on the player Player Tracking Unit Video 425 in the shared display 450. In an alternative embodiment (not shown), an area of the screen layout on the game is reserved, and the Player Tracking Unit Video is overlaid on top of the game. This might be reserved for such information as player name, credits available, or other game or system information.

Referring now to FIG. 4C, a transparency scenario is depicted. In this embodiment, the Player Tracking Unit Video 420 is overlaid on top of a Game Video 411 in the shared display 450. The Game Video is able to be viewed through a resulting Player Tracking Unit Video 422 with a customizable level of transparency from 0% (Player Tracking Unit Video is completely opaque) to 100% (Player Tracking Unit Video is completely transparent). In another embodiment, it is advantageous and aesthetically pleasing to alter this level very quickly in a short period of time. When the level changes from 0 to 100 or alternatively from 100 down to 0, continuously or at certain values in the range, the resulting effect is for the Player Tracking Unit Video 422 to fade in or fade out over the Game Video 411.

Figure 5:
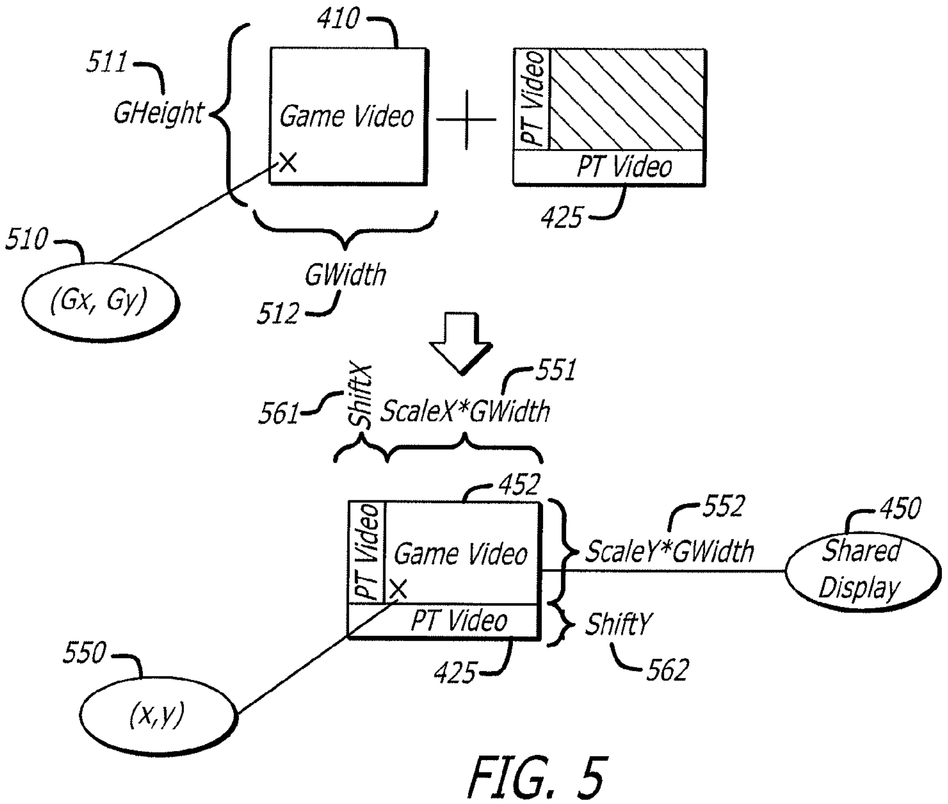
FIG. 5 is a diagram demonstrating how the Video Switcher scales video.

FIG. 5 shows the scaling performed on the Game Video. In this embodiment, the Game Video 410 is scaled and shifted and displayed Picture-in-Picture 452 on the shared display 450. The original Game Video height ("GHeight") 511 and width ("GWidth") 512 is scaled horizontally by a factor of ScaleX (0 to 100%) and vertically by ScaleY (0 to 100%). A resulting Game Video 452 has a width of ScaleX*GWidth 551 and a height of ScaleY*GHeight 552. The scaled Game Video 452 is shifted horizontally by ShiftX 561 and vertically by ShiftY 562, so that its lower left coordinate (0,0) on the original Game Video 410 is physically located at coordinate (ShiftX, ShiftY) on the shared display 450. Coordinate (Gx, Gy) 510 on the Game Video 410 would be translated to (x, y) 550 on the shared display 450 in such a way that:

$$x=\mathrm{Shift}X+(\mathrm{Scale}X*Gx)$$

$$y=\mathrm{Shift}Y+(\mathrm{Scale}Y*Gy)$$

Figure 6:
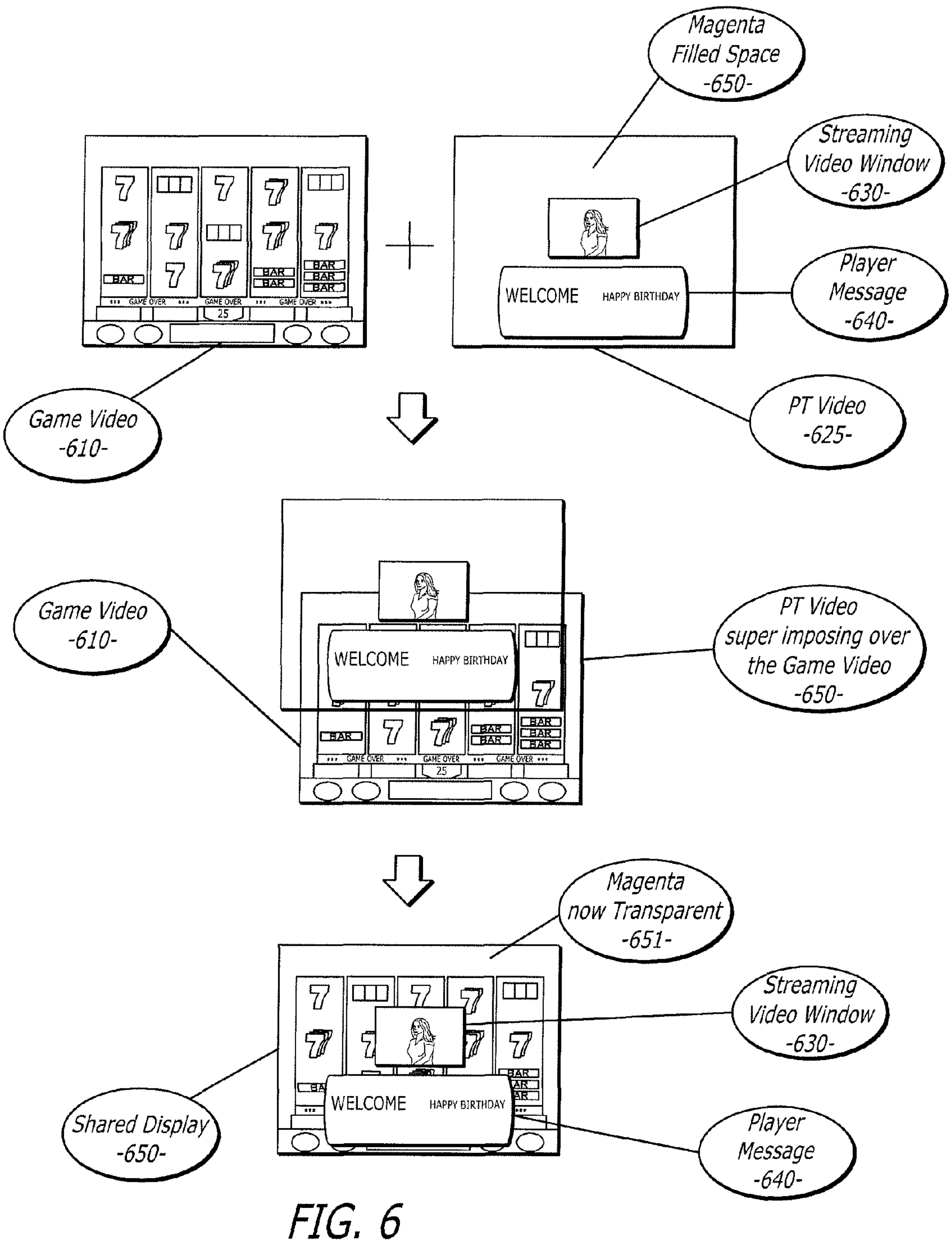
FIG. 6 is a diagram demonstrating super imposing one video stream over another.

Still in another embodiment, one video input is superimposed over another, allowing part of a first video signal to be fully transparent, thus allowing the second video signal to be completely visible at those coordinates, while having other parts of the first video signal to completely obscure the second signals at other coordinates. FIG. 6 is a diagram demonstrating one embodiment where a system video signal is superimposed over the Master Game Controller signal. In a non-limiting example, a Game Video 610 shows a five-reel video slot game. In other non-limiting embodiments, the Game Video may be video from any electronic video game, such as video reel slot games, video poker, video blackjack, video roulette, video craps, video keno, and video and electronic bingo. One skilled in the arts will appreciate that the wagering game video source could include any existing or future wagering game, including a 3D video game, dexterity-based skill games, knowledge-based skill games, lottery terminals, and the like.

A Player Tracking Video 625 is shown as a single screen with three areas of interest. First, there is a streaming video window 630 presenting some video-on-demand. Second, there is a player message window 640 presenting a welcome message to a recognized player. In one embodiment, the player is recognized by inserting his loyalty or player's club card into a card reader on the gaming machine 100. The Player Tracking Unit 140 reads the identification number and requests the player name and other player information from the slot system or CMS. Once the information has been sent to the player device, it then displays one or more messages applicable to this player, including possibly target advertisement, personal, or other messages.

In another embodiment, the Player Tracking Unit may recognize the player through a biometric face or retinal camera. Still, in another embodiment, the Player Tracking Unit may recognize the player through finger print recognition technology by either having the player touch or swipe his finger across a reader, or by having the reader embedded in another peripheral, such as a button or touch screen. The third area of interest on the Player Tracking Unit Video 625 is the remaining unused screen area 650 that has been colored Magenta.

In other non-limiting embodiments, this color could be green, blue, or any other color that is guaranteed not to show up in the other used areas of the screen. The Display Manager 200 super imposes 649 the Player Tracking Unit Video 625 on top of the Game Video 610. The resulting Shared Display 650 shows the super-imposed image including the Streaming Video Window 630, the Player Message Window 640 unchanged, and now the remaining screen which is now transparent 651, although it is Magenta on the original video signal.

In still another non-limiting embodiment, the opaque areas of the super imposed images 630 and 640 may apply a customizable level of transparency from 0% (completely opaque) to 100% (completely transparent). In another embodiment, it is advantageous and aesthetically pleasing to alter this level very quickly in a short period of time. When the level changes from 0 to 100 or alternatively from 100 down to 0, continuously or at certain values in the range, the resulting effect is for the super-imposed image 625 to fade in or fade out over the background image 610.

Figure 7:
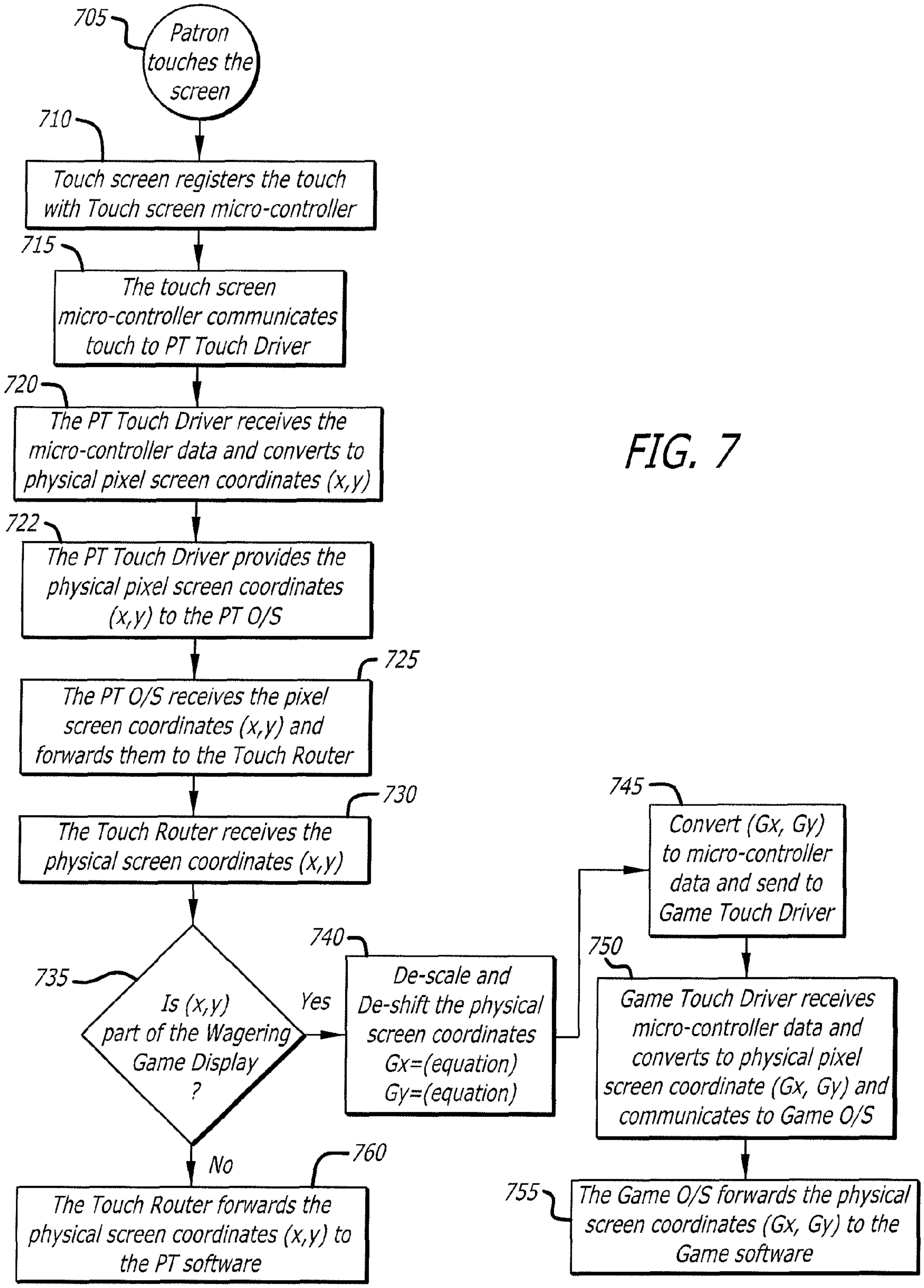
FIG. 7 is a logic diagram charting a touch screen signal from a patron's touch to the final software endpoint receiving the relative pixel screen coordinate.

Turning to FIG. 7, a flowchart is shown charting the touch screen signal from a player's touch to the final software endpoint receiving the relative pixel screen coordinate. In use, the player touches the screen 705 which is registered with the touch screen micro-controller 710. The micro-controller communicates the touch signal to the Player Tracking touch driver 715, which interprets the micro-controller protocol to calculate the physical pixel coordinates (x,y) of the touch 720. The Player Tracking Unit touch driver provides these coordinates to the Player Tracking Unit OS 722 such as Windows.

Other non-limiting embodiments associated operating systems are Linux, OSX, QNX, MS-DOS. The Player Tracking Unit 140 O/S receives the physical screen coordinates of the touch (x,y) and forwards them to the Touch Router 725. The Touch Router receives the coordinates (x,y) 730 and makes a determination 735 if the coordinates refer to a location currently displaying video from a video source other than the Player Tracking Unit 140, e.g., a Wagering Game executing on a Master Gaming Controller 110. If the source is from an application running on the Player Tracking Unit 140, the Touch Router forwards the physical screen coordinates (x,y) to the Player Tracking Unit software 760. However, if the touch corresponds to a video signal from the Master Gaming Controller 110, the Touch Router calculates the coordinates (Gx, Gy) from the perspective of the originating video source.

In one embodiment, the game screen coordinates are calculated 740 from the scale factor (ScaleX, ScaleY) and shift values (ShiftX, ShiftY) employed to scale and shift the game video signal onto the shared display, as exemplified in FIG. 5. In this way the (Gx, Gy) coordinates would be calculated in such a way that:

$$Gx = \frac{(x - ShiftX)}{ScaleX}$$

$$Gy = \frac{(y - ShiftY)}{ScaleY}$$

The Touch Router converts the calculated coordinates (Gx, Gy) to a micro-controller protocol sent to the Game Touch Driver 745. The Game Touch Driver receives the micro-controller data and converts to the physical screen coordinates (Gx, Gy) and communicates these coordinates to the Game O/S 750. Then, the Game O/S forwards the coordinates to the Game Software 755.

In another embodiment, the determination logic 735 may be embedded in the Player Tracking Unit software managing the screen displayed in the Player Tracking Unit Video. The Player Tracking Unit software determines if the touch is on an active part of its display (e.g., a visible portion) or a non-active portion (e.g. a transparent portion or outside the range of an active display). If the touch is on an active portion, it handles the touch through its normal method. If the touch is on an inactive portion, it forwards the (x,y) coordinate to the de-scaling and de-shifting component which converts coordinates and forwards them to the appropriate device, e.g., the device providing the video source on which the player touched.

In still another embodiment, system-rendered content may be shown on a small iVIEW display (640×240) and a primary game display (main or secondary). A player may elect to have the data shown on one or both screens simultaneously. Triggering events may force the larger primary game screens to render the media to provide the best customer experience.

In some embodiments, the PIP windows may slide in or out of view when they are not needed. They may also fade in or out as needed as well. Monitored data from the game, Player Tracking Unit device or a server may trigger these windows (PIP) to appear/disappear based upon business rules or thresholds.

In some embodiments a player may reposition/resize any PIP window, and all of the other graphics will automatically or manually re-organize/rescale/resize. Player-preferred screen configurations may be saved for later use on this or another gaming machine at a later data. This configuration data is stored in a save state server and associated with a player identifier, a game identifier, and a cabinet/display identifier. A player is provided with a configuration screen to set the desired modes. Level of transparency for any and all windows is also configurable for a player and may be maintained in the save state server. A player may configure how they want to look at the game to build a fully customizable gaming experience.

There is a growing demand in the gaming environment for a video and touch screen switching hardware device, system, and/or method. An embodiment of such a device, system, and/or method mixes (e.g., switches, arbitrates, redistributes, routes, or the like) the VGA outputs from both the iVIEW (or other system gaming/Player Tracking Unit) and main game processor board to drive either or both the main game and secondary displays. Furthermore, the device would intelligently route touch screen events to either the game or iVIEW software components. The device would allow multiple windows driven by the base game and system components to simultaneously be shown on the same display(s). One embodiment of a video and touch screen switching device provides a migration strategy for current iVIEWs (or other system gaming/Player Tracking Unit) with some quick immediate modifications, and requires little or no work for gaming manufacturers to implement.

A preferred embodiment of a video and touch screen switching device maintains a wall of separation between the regulated gaming devices and their associated gaming equipment. The embodiment enables an operator to provide differentiated customer experiences on their games, and also consistent customer experience for their systems and every other part of their casino and brand. This embodiment enables the above-described, operator-desired functionality, meaning that differentiated experiences are pushed to each game manufacturer and exist on the gaming device, while consistent experiences may be implemented by a single vendor and exist on the associated equipment device, or possibly an adjunct gaming device accessory (depending on regulatory requirements). This embodiment addresses customer demands in a relatively quick manner, provides more satisfaction for the customer, and may be more palatable for other manufacturers.

Figure 8:
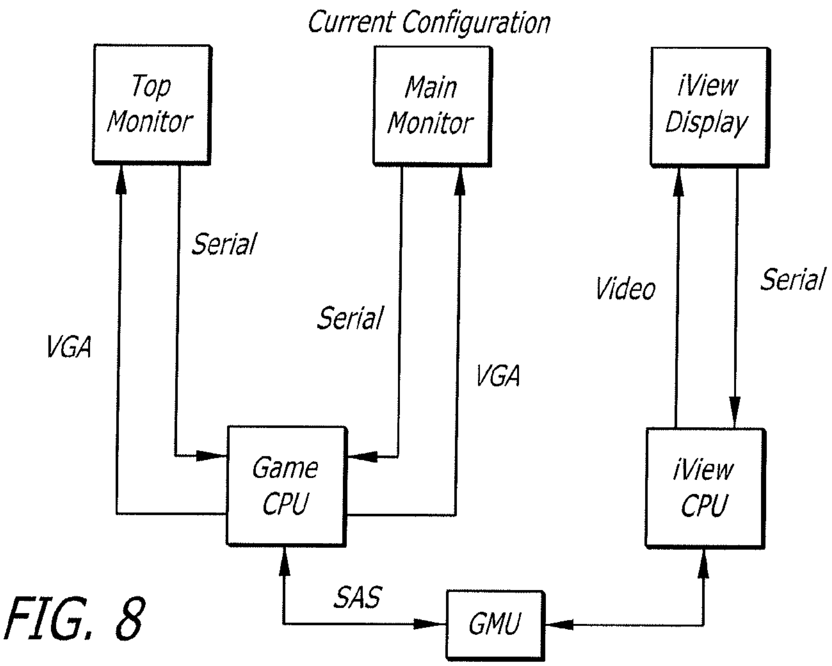
FIG. 8 is a component diagram demonstrating the current configuration of a gaming system.

One embodiment of the Display Manager (see FIG. 8) generally includes the game CPU (or Master Gaming Controller 800) connected to the main monitor 802 and/or top monitor 804 using standard VGA connection. A touch screen on either of these devices is connected to the Game CPU via a serial connection. The iVIEW processor 806 is integrated with the small 640×240 iVIEW display 808. The iVIEW has a serial touch screen. Both the Game CPU and iVIEW (or other system gaming/Player Tracking Unit) connect their audio into a separate switching device, allowing volume setting and balancing by a slot tech. A Game Monitoring Unit ("GMU") 810 is connected to the base game.

Figure 9:
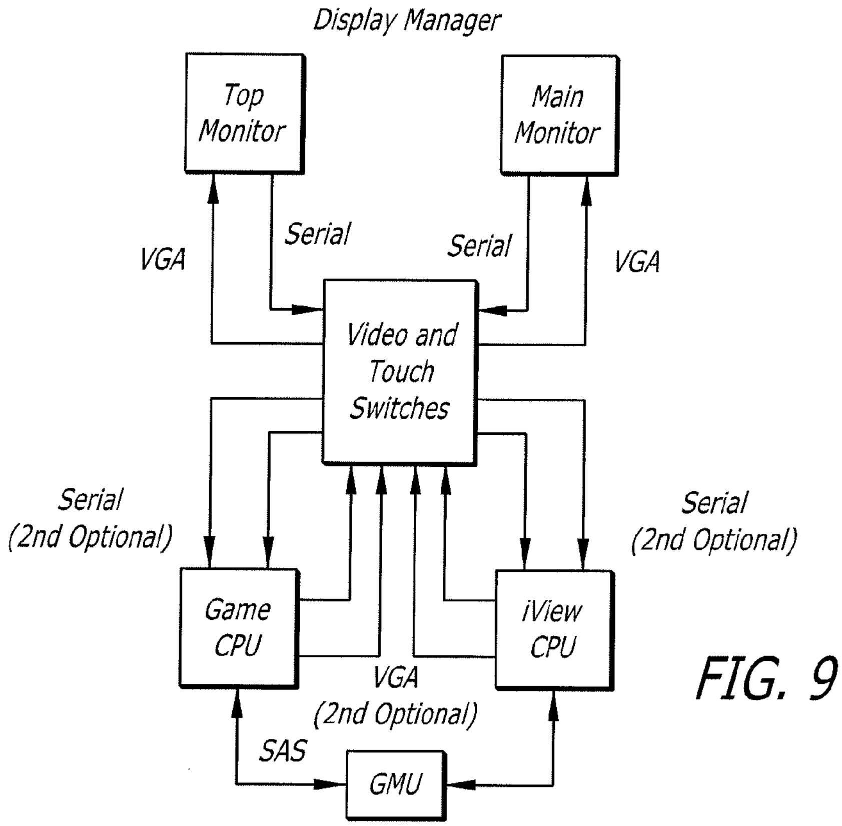
FIG. 9 is a component diagram depicting the components a Display Manager embodiment.

In one embodiment shown in FIG. 9, a Display Manager (i.e., Game/System Switcher) includes a video and touch screen switcher disposed between the touch screen displays and the Game CPU and iVIEW, allowing the Game CPU and iVIEW to effectively share the devices. These switchers may be either software or hardware. In one embodiment, a small hardware video switcher would be used along with implementing the touch switcher in software running on the iVIEW. In this embodiment, the Display Manager receives two VGA signals to be mixed and rendered, without copying and/or saving of the original signals (e.g., switched, arbitrated, redistributed, routed, or the like), to a first monitor via a first VGA output signal.

Figure 10:
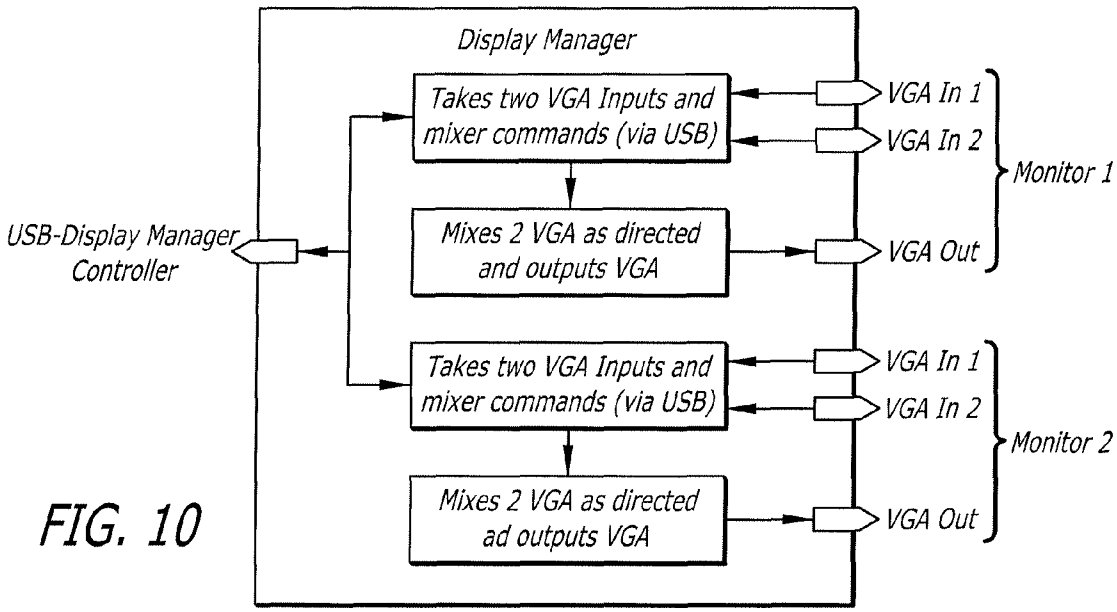
FIG. 10 is a component diagram of one embodiment of a Display Manager.

In another embodiment as shown in FIG. 10, an option is extended to two monitors. The Display Manager receives two additional VGA signals to be mixed and rendered, without copying and/or saving of the original signals (e.g., switched, arbitrated, redistributed, routed, or the like), to a second monitor via a second VGA output signal. Mixing commands may be received from the iVIEW via a USB connection.

Figure 11:
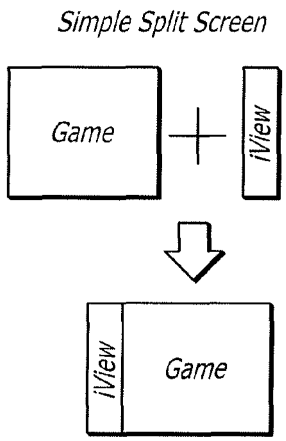
FIGS. 11-13 are diagrams of different screen splitting embodiments.

In its most simple implementation, the game content may be scaled, and iVIEW content may be placed beside it in a split screen configuration, as shown in FIG. 11. In this embodiment, the iVIEW (or other system gaming/Player Tracking Unit) instructs the Display Manager to scale the game VGA signal to allow enough room for the iVIEW content by supplying the overall coordinates (top, left, height, and width). The iVIEW then instructs the Display Manager to display the iVIEW VGA signal in the upper left corner, again by supplying the appropriate coordinates. The iVIEW has the intelligence to know the existing game state and player tracking state and may re-size, scale, or position windows based upon business rules.

Figure 12:
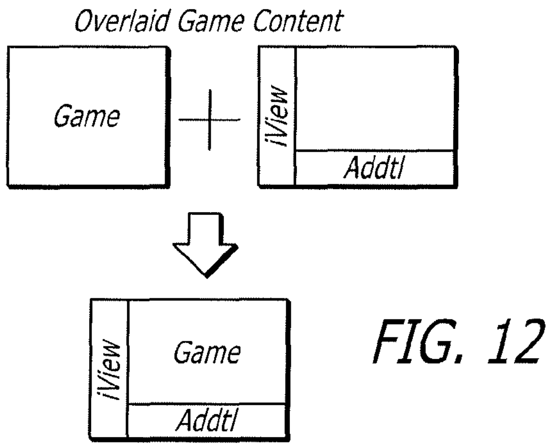

In order to preserve the aspect ratio of the game and minimize distortion, the iVIEW may accommodate a full-size screen display, leaving a space for the game content of appropriate proportions as shown in FIG. 12. This technique opens up real estate on top and bottom of the game window. The iVIEW (or other system gaming/Player Tracking Unit) then instructs the Display Manager to display the iVIEW content full screen and to overlay the scaled game window in the appropriate location.

Figure 13:
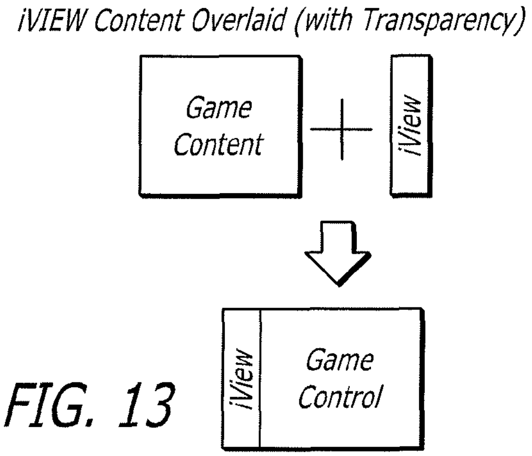

Alternatively, in another embodiment, the iVIEW (or other system gaming/Player Tracking Unit) may instruct the Display Manager to display the game content full screen and overlay the iVIEW content (e.g., System Window) on top of the game content as depicted in FIG. 13. Additionally, the Display Manager supports transparency, allowing the game content to be visible through the iVIEW content.

Figure 14:
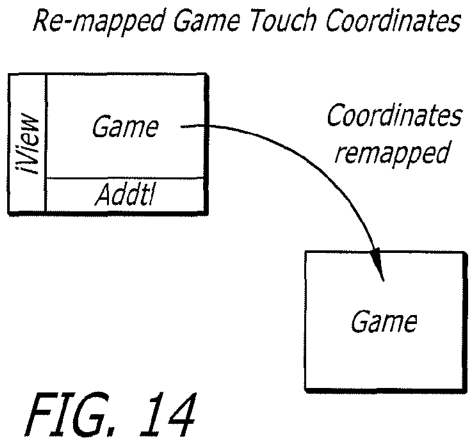
FIG. 14 is a diagram depicting re-mapped game touch coordinates.

The iVIEW receives physical screen coordinates via the standard touch screen. Using its knowledge of how the game content is positioned (since it instructed the Display Manager where to place the game content), the iVIEW may determine if the user touched the game content on the screen. Referring to FIG. 14, if the game content was touched, iVIEW passes the relative coordinates to the Display Manager, which calculates what the physical coordinates would have been if the game content had not been scaled. The Display Manager then passes these re-mapped coordinates by emulating the microcontroller of the touch screen. The touch controller is able to emulate the standard touch controllers on the floor.

Figure 15A:
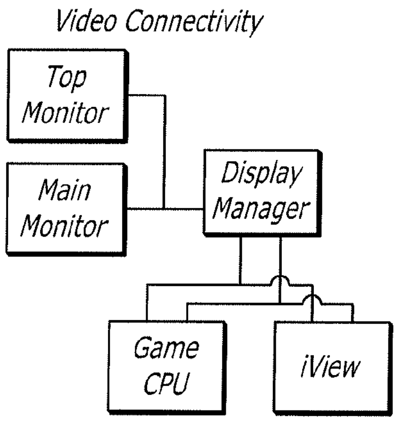
FIG. 15A is a component diagram depicting the video connectivity mapping of an embodiment including a video cabinet with a main monitor and a top monitor, where one Display Manager drives both monitors.
Figure 15B:
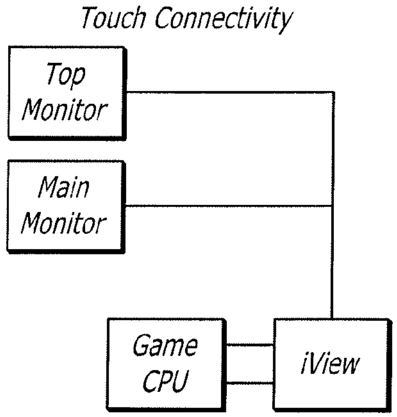
FIG. 15B is a component diagram depicting the touch connectivity mapping of the embodiment shown in FIG. 15A.

The Display Manager device, system, and method disclosed herein is adaptable to the various cabinet styles on the slot floor. In the case of a video cabinet sporting a top monitor, this Display Manager may drive both monitors simultaneously, depending on the processing power and VGA connections of the iVIEW (or other system gaming/Player Tracking Unit). Referring to FIG. 15A, the Display Manager (i.e., video switcher) receives two VGA inputs from the Game CPU and two from the iVIEW and plugs into the VGA ports of both the upper and lower monitors. The Display Manager receives commands from iVIEW on how to re-render (e.g., switch, arbitrate, redistribute, route, or the like) game content or iVIEW content or a combination of both on one or both screens, possibly simultaneously. Likewise, as shown in FIG. 15B, upper and lower touch screens plug directly into COM ports on the iVIEW. The Game CPU plugs both of its serial connections into the iVIEW board. The software touch switcher on the iVIEW receives inputs from the two touch screens and sends the re-mapped coordinates to the Game CPU on the appropriate serial connection.

Driving dual monitors enables persistent secondary content to display on the top monitor (e.g. advertising, secondary games) where it is easily viewed by both the player and others that might be in the surrounding area while placing short-lived, customer interactive content (e.g., Service window menus, and the like) on the main game monitor, which is better positioned ergonomically for customers' interaction.

Figure 16A:
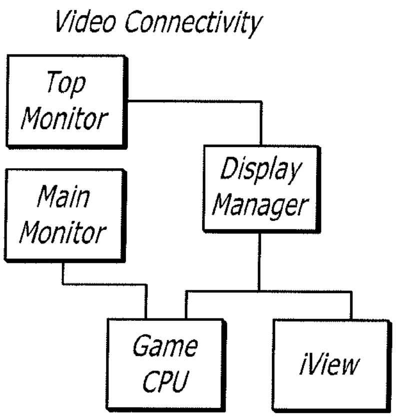
FIG. 16A is a component diagram depicting the video connectivity mapping of an embodiment including a video cabinet with a main monitor and a top monitor, where one Display Manager drives only the top monitor.
Figure 16B:
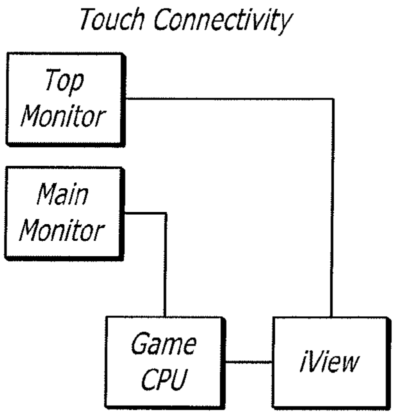
FIG. 16B is a component diagram depicting the touch connectivity mapping of the embodiment shown in FIG. 16A.

In one non-limiting embodiment in which the iVIEW lacks the processing power or necessary ports to drive both monitors and of a dual display cabinet, the Display Manager (i.e., game/system switcher) may be configured to drive only one of the monitors (either top or bottom). In this embodiment, the Display Manager as shown in FIG. 16A only receives the VGA input from the shared monitor and the iVIEW. The software touch switcher as shown in FIG. 16B on the iVIEW has a COM connection to the shared touch screen and a single COM connection to the Game CPU. The main monitor is still dedicated to the game by maintaining its direct VGA and COM connection to the Game CPU.

Figure 17A:
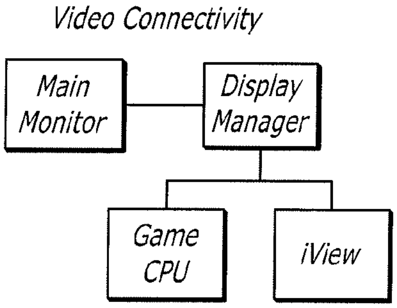
FIG. 17A is a component diagram depicting the video connectivity mapping of an embodiment including a video cabinet with a single monitor, where one Display Manager drives the monitor.
Figure 17B:
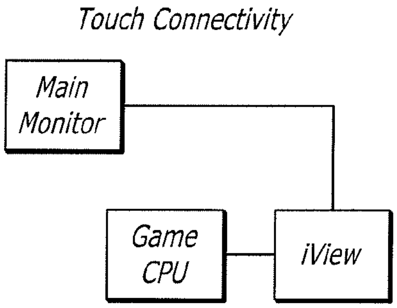
FIG. 17B is a component diagram depicting the touch connectivity mapping of the embodiment shown in FIG. 17A.
Figure 18A:
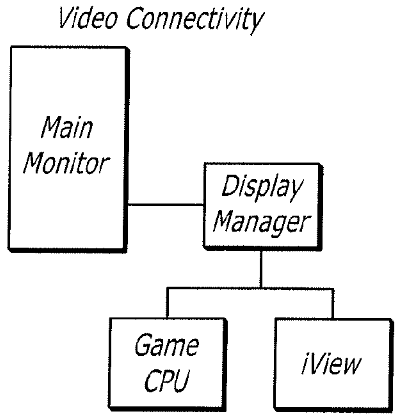
FIG. 18A is a component diagram depicting the video connectivity mapping of an embodiment including a video cabinet with a rotated widescreen monitor, where one Display Manager drives the monitor.
Figure 18B:
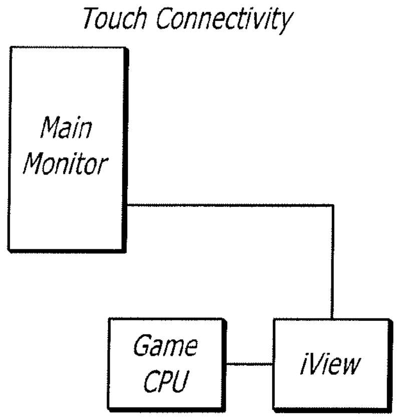
FIG. 18B is a component diagram depicting the touch connectivity mapping of the embodiment shown in FIG. 18A.

In FIGS. 17A and 17B, the case of a video cabinet with no top monitor is shown and is similar to the previous embodiment. The Display Manager is configurable to support different resolutions and aspect ratios (e.g., widescreen displays). Additionally, the unique aspect ratio is the rotated widescreen single monitor as shown in FIGS. 18A and 18B. This provides similar viewing access as a dual display cabinet on a single screen. The iVIEW (or other system gaming/Player Tracking Unit) is responsible for managing the unique "real estate" layout (i.e., the display screen area) and directing the Display Manager appropriately on where to place overlays.

Figure 19A:
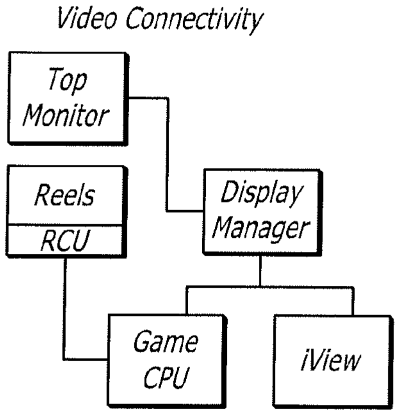
FIG. 19A is a component diagram depicting the video connectivity mapping of an embodiment including a stepper cabinet with a top monitor, where one Display Manager drives the top monitor.
Figure 19B:
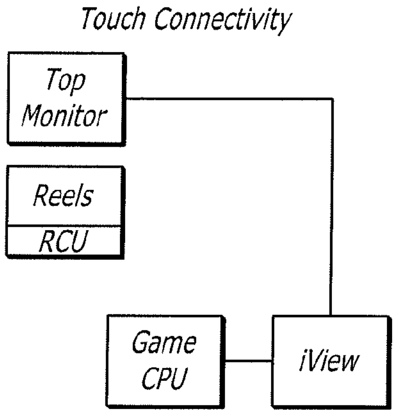
FIG. 19B is a component diagram depicting the touch connectivity mapping of the embodiment shown in FIG. 19A.

Another embodiment of a single screen solution is the stepper cabinet with a top monitor as shown in FIGS. 19A and 19B. The Game CPU maintains its connection to a Reel Controller Unit. The Display Manager (see FIG. 19A) mixes (e.g., switches, arbitrates, redistributes, routes, or the like) the Game CPU top monitor content with the iVIEW content. The software touch switcher (see FIG. 19B) sends the re-mapped touch coordinates to the Game CPU.

Figure 20A:
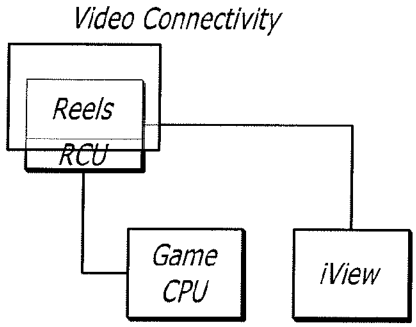
FIG. 20A is a component diagram depicting the video connectivity mapping of an overlay embodiment including a stepper cabinet with no top monitor, where an iVIEW device is connected directly to a transparent overlay.
Figure 20B:
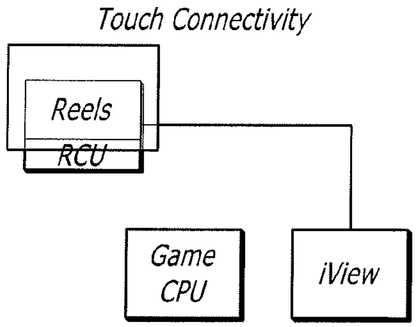
FIG. 20B is a component diagram depicting the touch connectivity mapping of the embodiment shown in FIG. 20A.
Figure 21A:
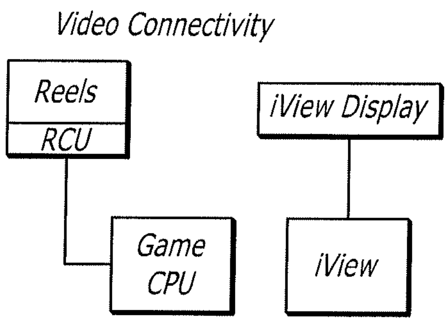
FIG. 21A is a component diagram depicting the video connectivity mapping of an embodiment including a stepper cabinet with no top monitor and having a standard iVIEW device and display.
Figure 21B:
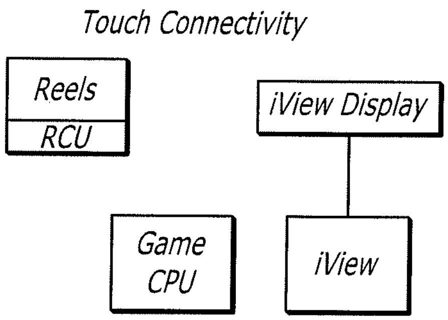
FIG. 21B is a component diagram depicting the touch connectivity mapping of the embodiment shown in FIG. 21A.

In yet another cabinet style, the stepper cabinet has no top monitor as shown in FIGS. 20A and 20B. One possible solution is to install a transparent overlay over the reels. Since the Game CPU does not have any VGA output, there is no Display Manager or video switcher (see FIG. 20A), and the iVIEW VGA connects directly to the transparent overlay. The overlay becomes a dedicated iVIEW display replacement. Likewise, there is no touch mixing (see FIG. 20B). The iVIEW simply receives the touches from the overlay touch screen. Alternatively, another embodiment for stepper cabinets with no top monitors employs the current smaller iVIEW display, which is shown in FIGS. 21A and 21B.

In a preferred embodiment of the Display Manager device, system, and/or method, the game manufacturer does not have to take any additional actions to utilize the functionality of the device, system, and/or method. In some embodiments, a few event exception codes may be incorporated to G2S (Game to System) and/or SAS (Slot Accounting System), but an immediate benefits to manufacturers is the minimization of any costly development, QA, and/or manufacturer submissions.

In one embodiment, system-related features remain with system providers, and system-only peripherals remain independent of the base Game OS. As a result, operators may continue to enjoy rapid development and deployment of system features across the floor. A single implementation of new system features continues to ensure that customer experiences are consistent, independent of various implementations and capability differences across the various devices. Remote host providers may work with a single vendor to develop and support any third-party system capabilities. A single implementation provides consistency in the capabilities in the runtime environments on the floor. A single system manufacturer may easily and more quickly define system parameters and establish agreements for ensuring content runtime environments, thereby reducing the number of variations the content developers need to develop and support.

Similarly, a single system manufacturer may control the prioritization algorithms for displaying content across the floor. Operators may work with a single vendor to ensure that high priority content is displayed appropriately, e.g., simultaneously, in a timely manner. Keeping common software infrastructure components (e.g. Flash player), potentially used by third parties, are more likely to remain up-to-date since updating them is dependent only on a single manufacturer and platform. Systems functionality remains on associated equipment reducing the risk increased regulatory overhead. Additionally, new cabinets are not required for customers to benefit from this technology.

The Display Manager offers benefits to the operators and industry. Depending on desired capabilities, this embodiment provides the operator with a migration strategy and the opportunity to preserve a portion of their investment in iVIEWs (or other system gaming/Player Tracking Unit) that they currently own. The existing board supports basic single-display mixing (e.g., switching, arbitrating, redistributing, routing, or the like).

Figure 22:
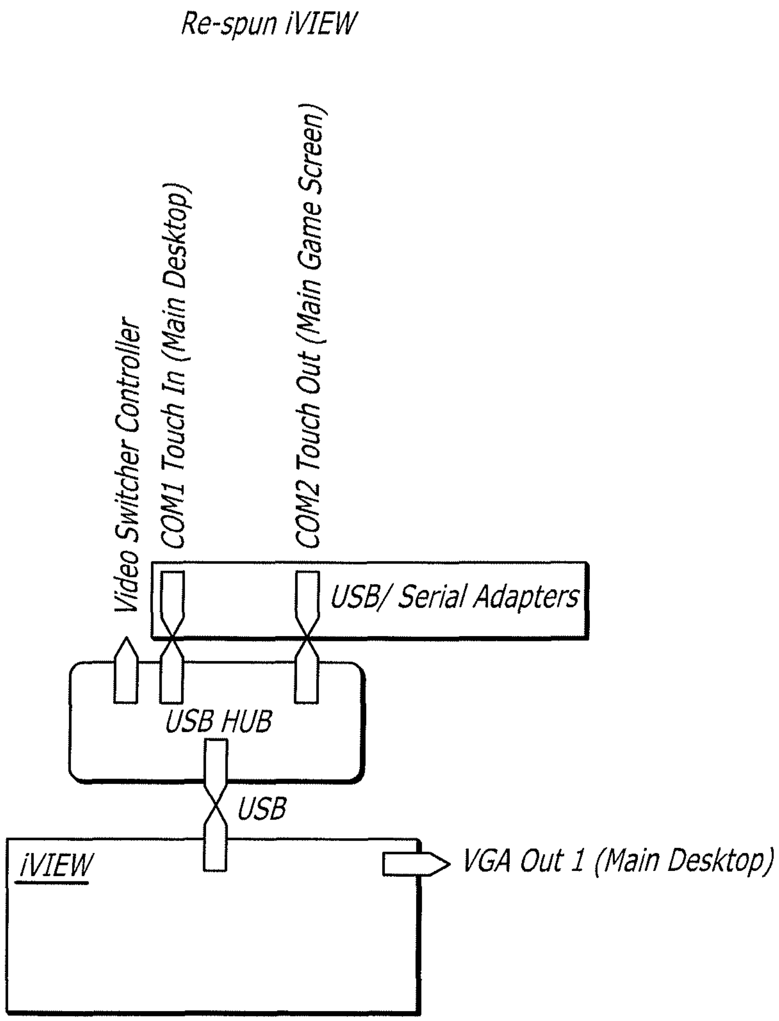
FIG. 22 is a component diagram of an embodiment of an iVIEW.
Figure 23:
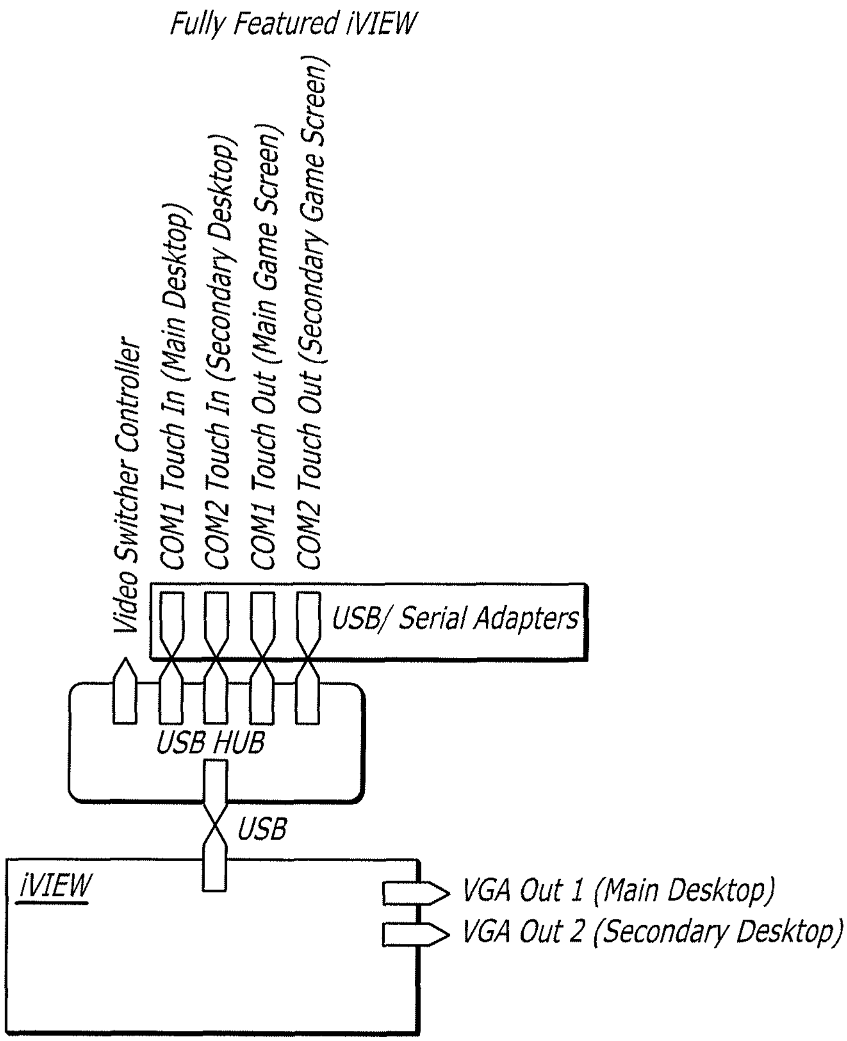
FIG. 23 is a component diagram of an embodiment of a fully-featured iVIEW with two VGA outputs.

An operator may upgrade any currently owned iVIEW (See FIG. 22) to provide a game monitor system window, a top monitor display, or both. As a result, the operators do not need to decide whether to purchase iVIEWs (or other system gaming/Player Tracking Unit) today or wait for a shared display solution. When the shared display solution is available, or otherwise timely to acquire, they may upgrade their machines, not only avoiding the full cost of the new capability, but also possibly extending the life of their exiting iVIEWs' processor. Once enhanced system gaming/Player Tracking Units are available (See FIG. 23), operators may purchase those on new machines moving forward.

Figure 24:
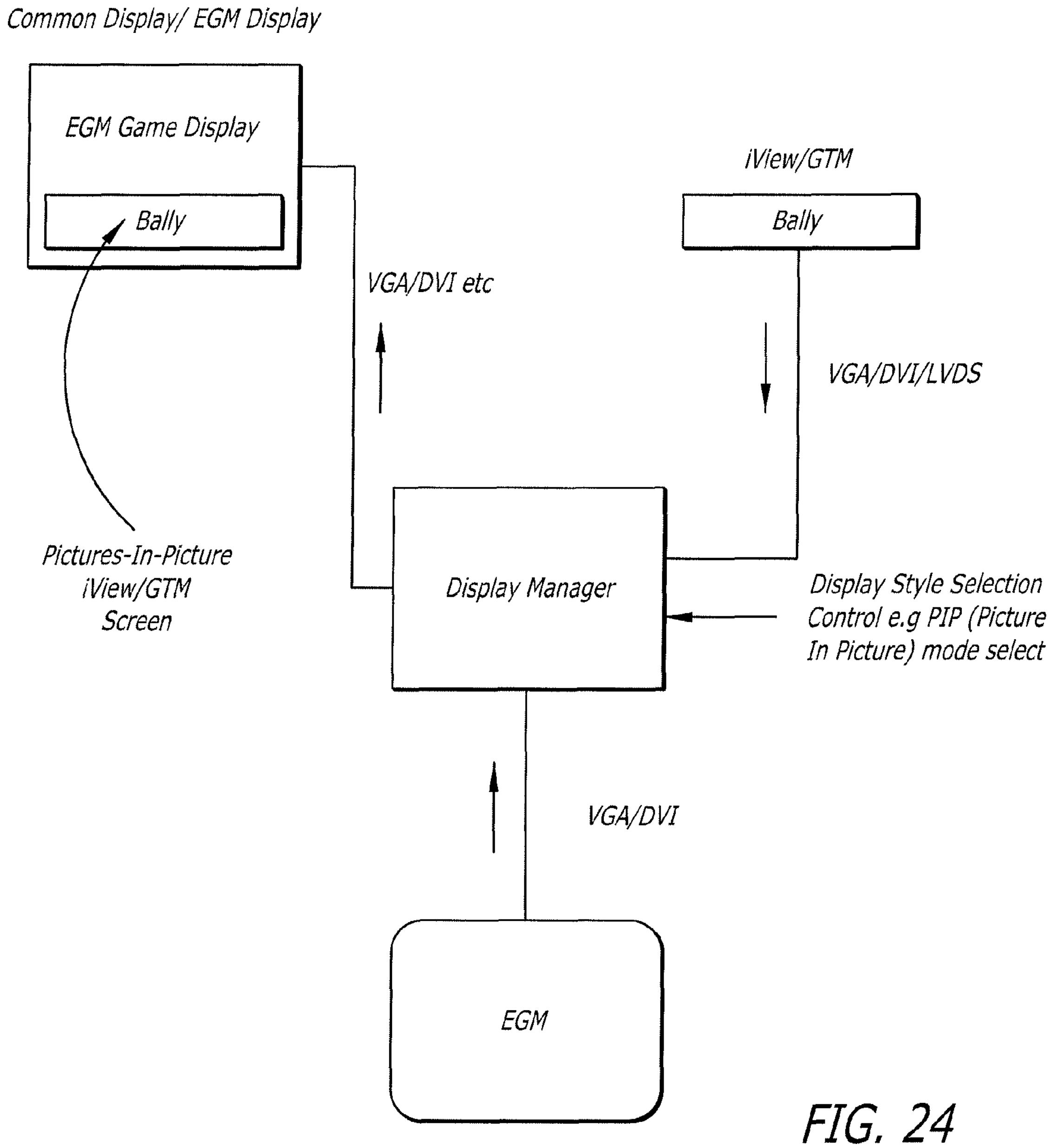
FIG. 24 illustrates a Display Manager combining the screen content from two or more sources without affecting the physical construction of the devices connected thereto.

Referring now to FIG. 24, in another embodiment, the Display Manager combines the screen content from two or more sources without affecting the physical construction of the devices connected to it. The mixing mode of the input screens depends on an external input using a USB or serial interface. Preferably, a Display Manager is an image processing unit that has two or more VGA/DVI (and possibly LVDS) inputs and a VGA/DVI output. Additionally, the mode select is another control input to the Display Manager that also acts as an input for dynamic size change commands. The Display Manager may utilize USB, RS-232, or another suitable protocol. The above-described input path may also be utilized for the upgrading of the Display Manager. In another embodiment, a coaxial input may be used to feed a Television/Tivo/DVR (digital video recorder) signal directly into the Display Manager.

In one such embodiment, the basic construction of the Display Manager is shown in FIG. 24. Specifically, the Display Manager may be used to generate a Picture-In-Picture mode. The common display is currently showing the gaming machine screen. The iView/GTM (Game Terminal Manager) has an important message that needs to be displayed on the main screen. A screen display mixing style PIP (Picture-In-Picture) is selected using the USB/Serial interface. The Display Manager combines the signal, performs the required image processing, and then provides the input to a common display. The common display shows the main game with a PIP of the iView/GTM message screen. The size of the PIP screen may also be dynamically changed using the selection input.

In such an embodiment, the control input may be used for screen mixing selection or for the size of the effects. For example, the screen mixing selection may be used with any of the following styles: PIP, POP (Picture-on-Picture), dissolver, fader, and vertical/horizontal/multimode screen splitter. Additionally, the size of the effects may be varied (e.g., the split screen or the PIP image size and position may be dynamically changed using the control input). Moreover, the Display Manager may be extended to more than two inputs so that a third input from a standard TV/Tivo/DVR may be connected to use any of the mixing styles for display on the main screen.

In a preferred embodiment of the Display Manager, display mixing effects may be implemented without any modifications to the current gaming machine or GTM hardware. Both the GTM and the gaming machine do not require any additional software changes other than the mode control. Even this change may be eliminated if the mode is a fixing mode (e.g., only PIP). Additionally, the Display Manager simplifies the implementation of the display mixing in all currently-existing filed hardware, because only a simple VGA cable has to be connected to the Display Manager instead of the gaming machine.

Referring now to the Display Manager software and configuration, the Display Manager operating system and content include right and bottom display panels. The operator has the option to select a panel that best suits the base gaming machine. The operator changes the screen configuration by entering the employee page and selecting the "Change DM Config" button.

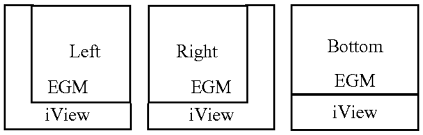

In one embodiment, an iVIEW controls the touch screen remapping of the gaming machine and iVIEW, as well as controlling the Display Manager. The Display Manager mixes the video outputs from the iVIEW and the main gaming controller, and displays the combined image on the game screen. The iVIEW OS controls the screen layouts via serial link to the Display Manager board.

Preferably, the iVIEW board performs touch screen remapping of the gaming machine and iVIEW screen. Touch screen inputs from the video area corresponding to the main game are routed to the game and inputs from the iVIEW area are routed to the iVIEW application. The touch screen management is performed by the iVIEW using a USB to Serial Port Converter. This system is compatible with the existing SDS (Slot Data System) environment and does not require modification to the main game OS.

In one embodiment, the GTM iVIEW operating system in the SD card is Microsoft Windows CE. The SD card also holds the iVIEW content, which may be customized for advertising, messages to the player or other casino-designed promotional messages. The minimum recommended compact flash size is 256 MB. The content or Operating System (OS) can be updated by replacing the GTM SD card.

Both the operating system and content are signed and authenticated. The GTM iVIEW hardware verifies the signatures of the OS and content. Additionally, the GTM iVIEW launches the operating system and application after the files are verified. If any of the files on the SD card are modified, the GTM iVIEW displays an error screen upon boot up. The casino may modify the content file (manufacturer folder in the SD card) but the new content must be resigned using the manufacturer DSA file signer (Level III signing). The operating system files may not be modified by the casino.

In one embodiment, the SD card content enables players to insert their cards to activate a standard player screen and request services, assistance, or other information with unavailable/non-supported items being "grayed out." The employee card activates a standard interface screen with associated operator, regulator, and diagnostic/installation functions.

In one non-limiting example, the interface with the Gaming Monitoring Unit (GMU) software is consistent using previously used interfaces. The GTM iVIEW uses a standard EPI port to connect to the GMU. Neither the GTM iVIEW Operating System, Application, nor Content modify the meters or the accounting information stored and processed by the GMU.

This embodiment is compatible with (1) Capstone Display Manager Board with OS version fli8548_RD4_board_ext_v7.hex; (2) SDS 8.2.X or higher; (3) MC300 Game Monitoring Unit with ECO 2103 or higher; (4) iVIEW Sound Mixer (GLI file number SY-22-SDS-06-14); and (5) GTM iVIEW touch screen display. Additionally, this embodiment introduces various enhancements and features, including (1) right and bottom Display Manager display screens; (2) new employee functions to select the left, right, or bottom Display Manager display screens; and (3) support for additional video resolutions (VESA-compliant; 640×480 to 1280×1024), video refresh rates (50 hz to 85 hz), video output (VGA and DVI), and touch screen serial interfaces (3M EX-II).

The Display Manager is a hardware component that mixes the iVIEW content and the game content and then displays the mixed content on the gaming machine's monitor-touch screen. Mixing the content for both the game and the iVIEW onto one screen provides players easier access for downloading credits from their accounts without interruption of game play or access to other player functions. The hardware component is installed between the iVIEW display and the gaming machine's monitor-touch screen.

In one embodiment, the following hardware and software are installed to connect and run the Display Manager feature: (1) iVIEW GTM (206978) with video pigtail (206970-00-0) and (2) DM operating system (OS). Additionally, in one embodiment, installation of the Display Manager uses the following components: (1) three USB Cables; (2) two USB to Serial Connectors; (3) USB Hub; (4) one Display Manager with VGA to DVI Converter, including a DVI cable; (5) one RS232 Serial Cable, Molex 8-pin from iVIEW J2 to 9-pin serial on the Display Manager; (6) one RS232 Cable USB Hub to monitor touch screen; (7) three VGA Cables (iVIEW VGA OUT to DM VGA to DVI converter IN, gaming machine Processor Board VGA OUT to DM VGA IN, and DM VGA OUT to gaming machine Monitor VGA IN); (8) one RS232 Null Modem Cable (USB Hub to gaming machine processor board touch screen 9-pin serial connector).

In another aspect of one embodiment, the Display Manager operating system (OS) and content held on the iVIEW SD card are upgraded when installing the Display Manager software. Typically, this is performed by inserting the SD (Secure Digital) card into the SD socket on the iVIEW.

Further, in one non-limiting embodiment, the Display Manager hardware is installed by plugging each cable into the appropriate connector on each piece of hardware as follows: (1) USB cable from iVIEW USB Host to USB Hub; (2) USB cable/serial to USB converter connector from USB Hub to RS232 cable to monitor touch screen; (3) USB cable/serial to USB converter connector from USB Hub to RS232 Null Modem cable to game machine processor board DB9 touch screen connector; (4) iView VGA OUT to Display Manager DVI converter box VGA IN port; (5) iVIEW RS232 to Display Manager serial 9-pin; (6) gaming machine VGA OUT to Display Manager VGA IN; (7) Display Manager VGA OUT to monitor VGA IN; (8) DVI cable from Converter OUT to Display Manager Converter IN (Converter dipswitches 1, 5, and 10 should be in the ON position).

Figure 25:
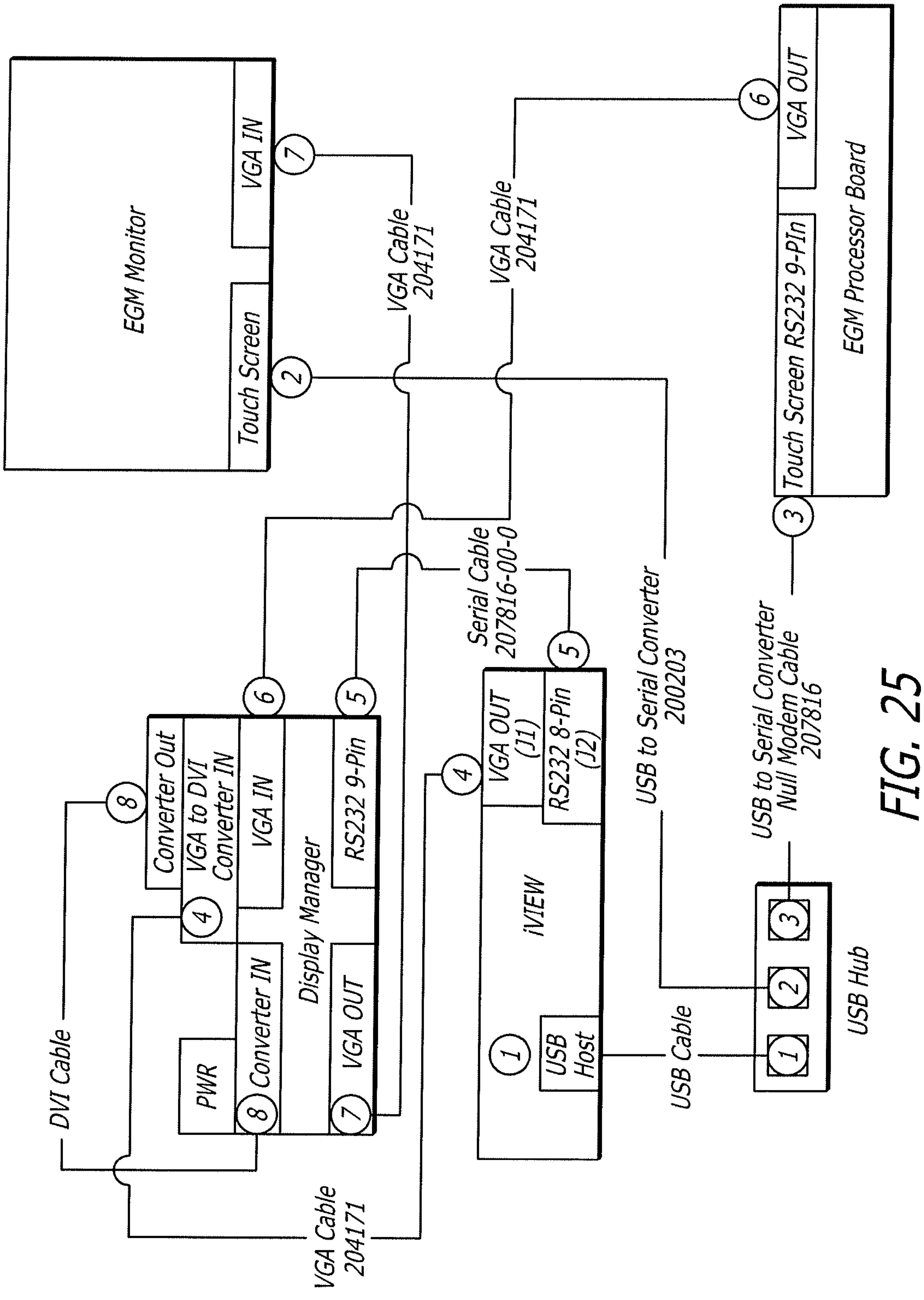
FIG. 25 illustrates installation and configuration of the Display Manager software and hardware.

Referring now to FIG. 25, after the Display Manager software and hardware have been installed, the gaming screen is then configured. In one embodiment, the configuration is performed by accessing the employee mode to calibrate the touch screen. Specifically, the touch screen is calibrated by accessing the employee mode, selecting touch screen calibration, and following the instruction prompts on the monitor for calibration.

Figure 26:
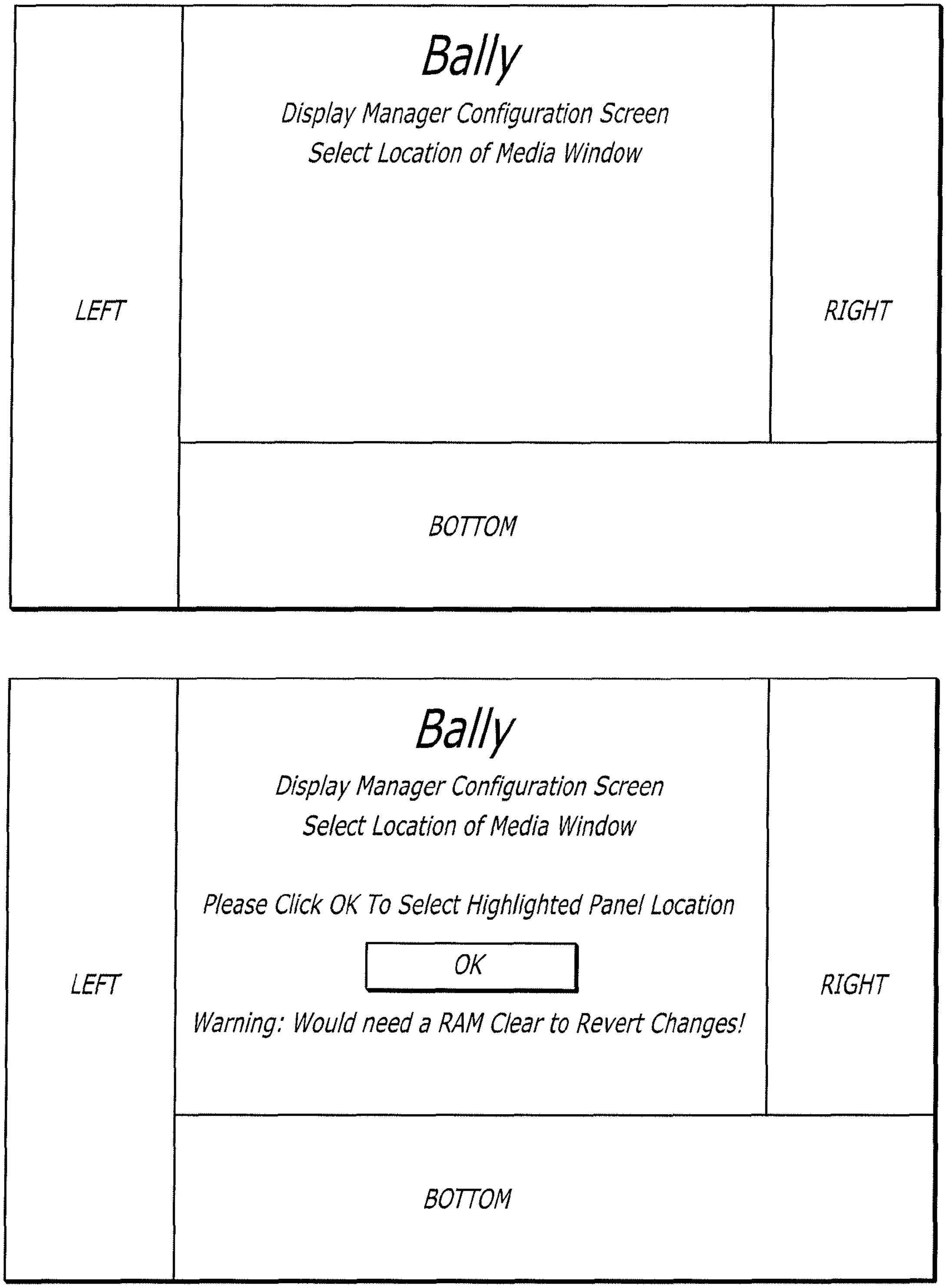
FIG. 26 illustrate Display Manager configuration screens.

As shown in FIG. 26, a user (1) accesses the employee mode, (2) selects the Display Manager Configuration Screen, and (3) touches the area of the screen where the menu is to display. The typical configuration for video gaming machines is as follows:—For the Left: Bottom bar is always on. The Menu displays on the left side. The game shrinks to fit the upper-right. For the Right: The bottom bar is always on. The Menu displays on the right side. The game shrinks to fit the upper-left. For Spinning-Reel machines, select Bottom. After the settings have been selected, touch OK to save the settings.

Figure 27:
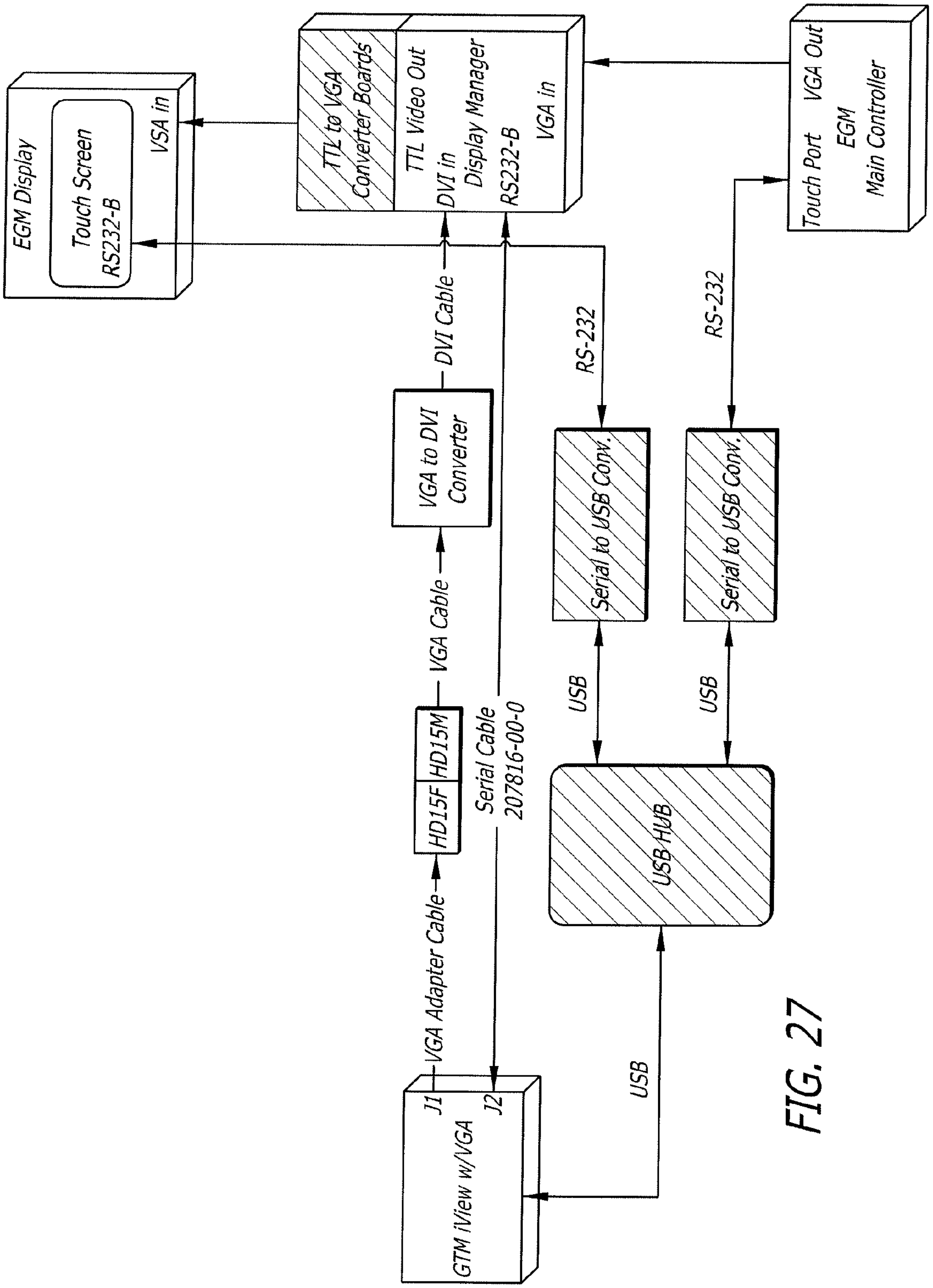
FIG. 27 illustrates a component diagram of the Display Manager shown in connection the Master Gaming Controller, the GTM iVIEW, and the gaming machine display screen.

Referring now to FIG. 27, a component diagram of the Display Manager is shown in connection the EGM main controller (Master Gaming Controller), the GTM iView, and the gaming machine's display screen (EGM display). Additionally, at least one possible non-limiting embodiment of the wiring of these components is shown. In another embodiment, the Display Manager is configured to support DVI & VGA on both inputs and output, eliminating the external TTL & DVI converters. In still another embodiment, touch scaling is incorporated into the Display Manager board, thereby eliminating the USB hub and serial-USB converters.

In yet another embodiment, Genesis FLI8668 scaler chip is used instead of the FLI8548 scaler chip. The Genesis FLI8668 scaler chip is more powerful and can support higher resolutions and more flexible PIP options. The FLI8668 scaler chip provides high integration for advanced, dual-channel applications of Picture-in-Picture (PIP) and Picture-by-Picture (PBP). Specifically, two videos decode with 3D comb filters and two channels of DCDi (Directional Correlation Deinterlacing) processing, and true 10-bit performance provides an extreme high-quality picture for a two-channel application.

Additionally, the FLI8668 scaler chip provides special performance features such as the Faroudja DCDi Cinema video format converter, blue stretch, DDR memory with a read-write of 10 bits per pixel, and flexible sharpening algorithms providing unparalleled performance. The FLI8668 scaler chip also includes an integrated Analog Front-End (AFE) that includes two triple ADCs, a cross-point switch, and two Faroudja Intellicomb™ 3D comb filters. The flexible AFE ensures simple PCB design with direct connections to TV tuners and input video connectors.

Genesis Microchip Inc., the maker of the Genesis scaler chip has been acquired by STMicroelectronics (NYSE: STM). Worldwide Headquarters located at STMicroelectronics, 39, Chemin du Champ des Filles, C. P. 21, CH 1228 Plan-Les-Ouates, GENEVA, Switzerland. One of ordinary skill in the art will appreciate that other equivalent (or better) scaler chips may also utilized without departing from the scope of the invention.

Figure 28:
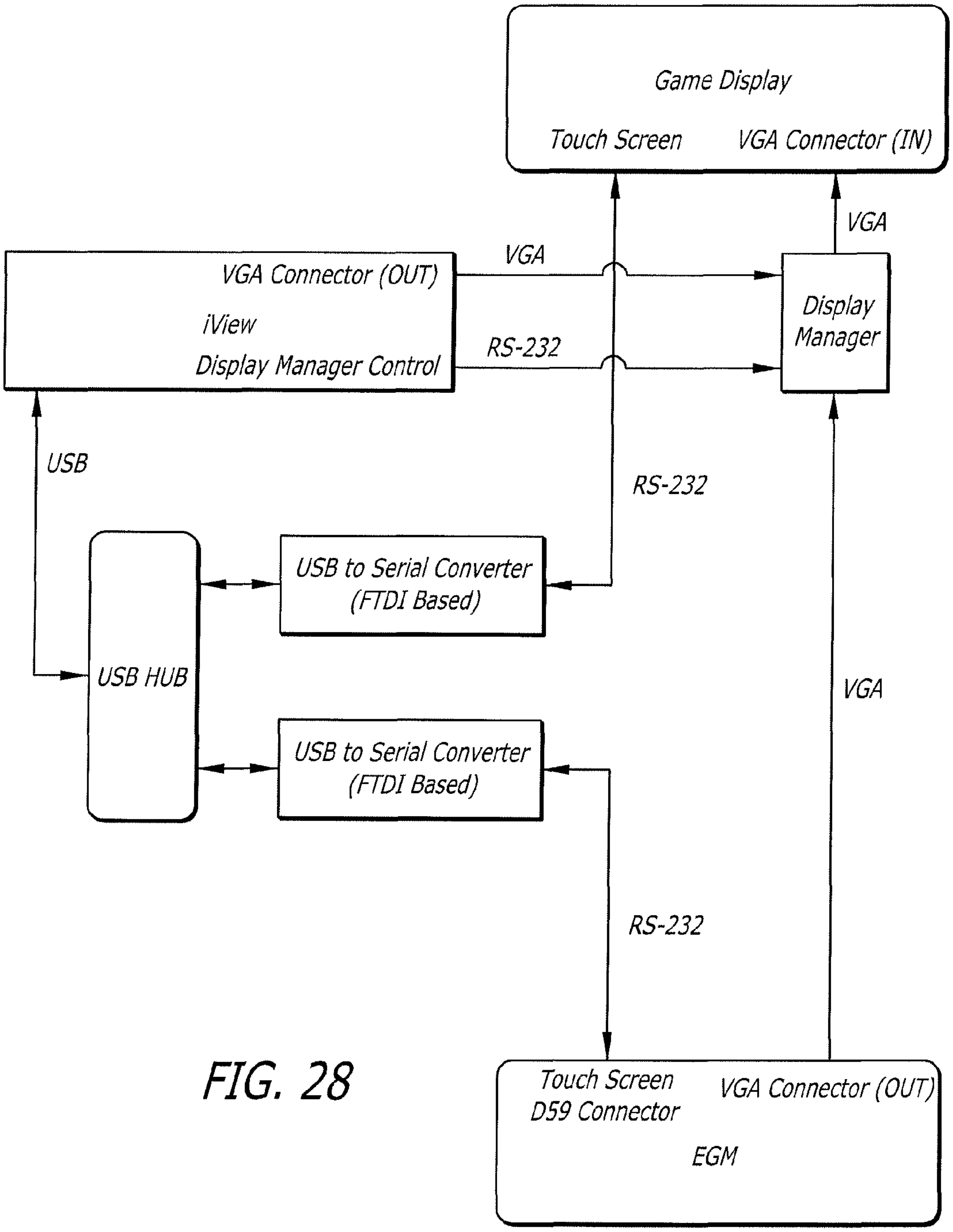
FIG. 28 illustrates a video connection and the touch screen control diagram of the Display Manager shown in connection the Master Gaming Controller, the iVIEW, and the Game Display.

Referring now to FIG. 28, a simplified component diagram of the Display Manager is shown in connection the EGM main controller (Master Gaming Controller), the iView, and the Game Display. The component diagram shows both the video connections and the touch screen control.

Figure 29:
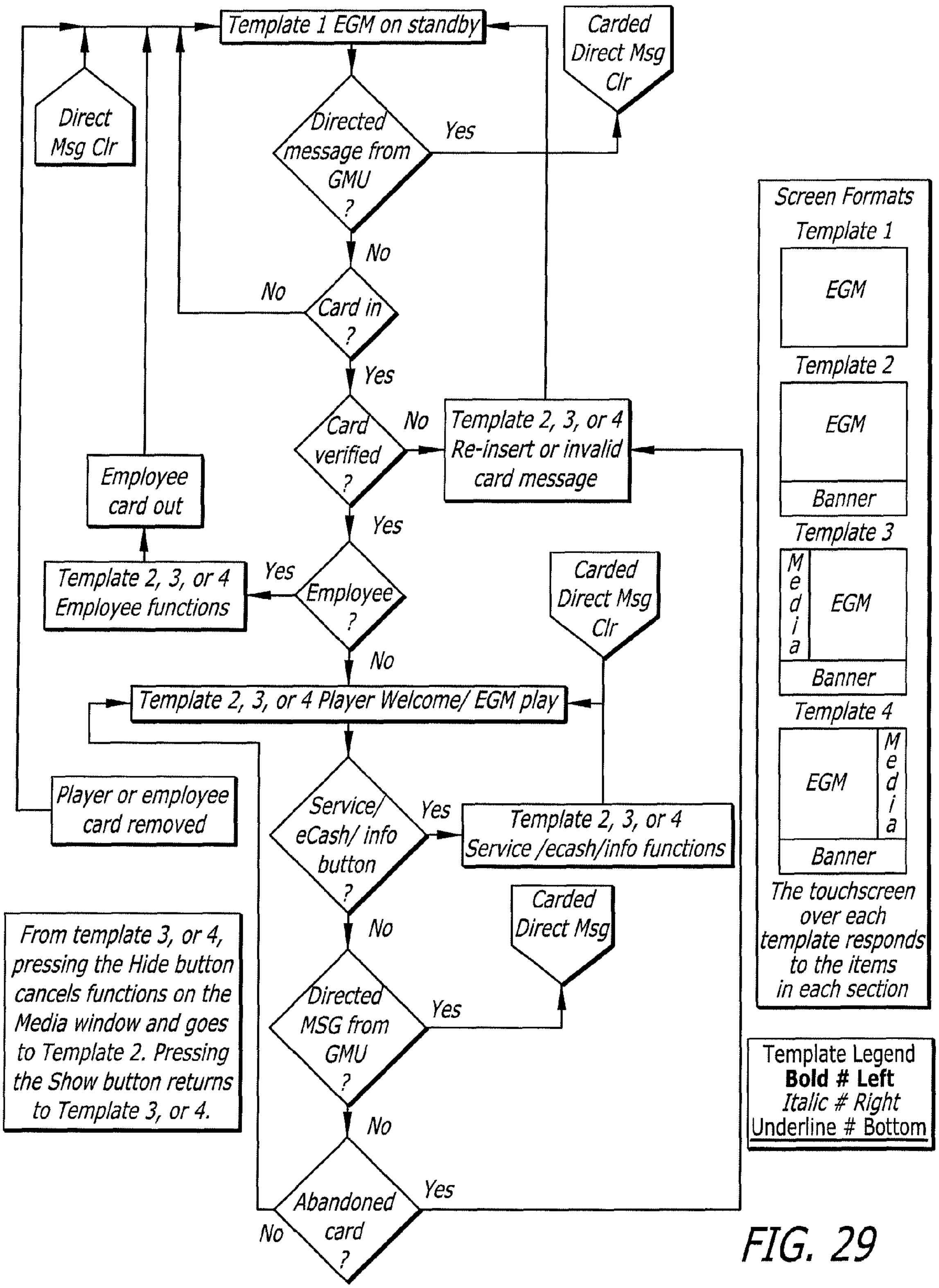
FIG. 29 is a logic flow diagram illustrating the Display Manager's basic functions.
Figure 30:
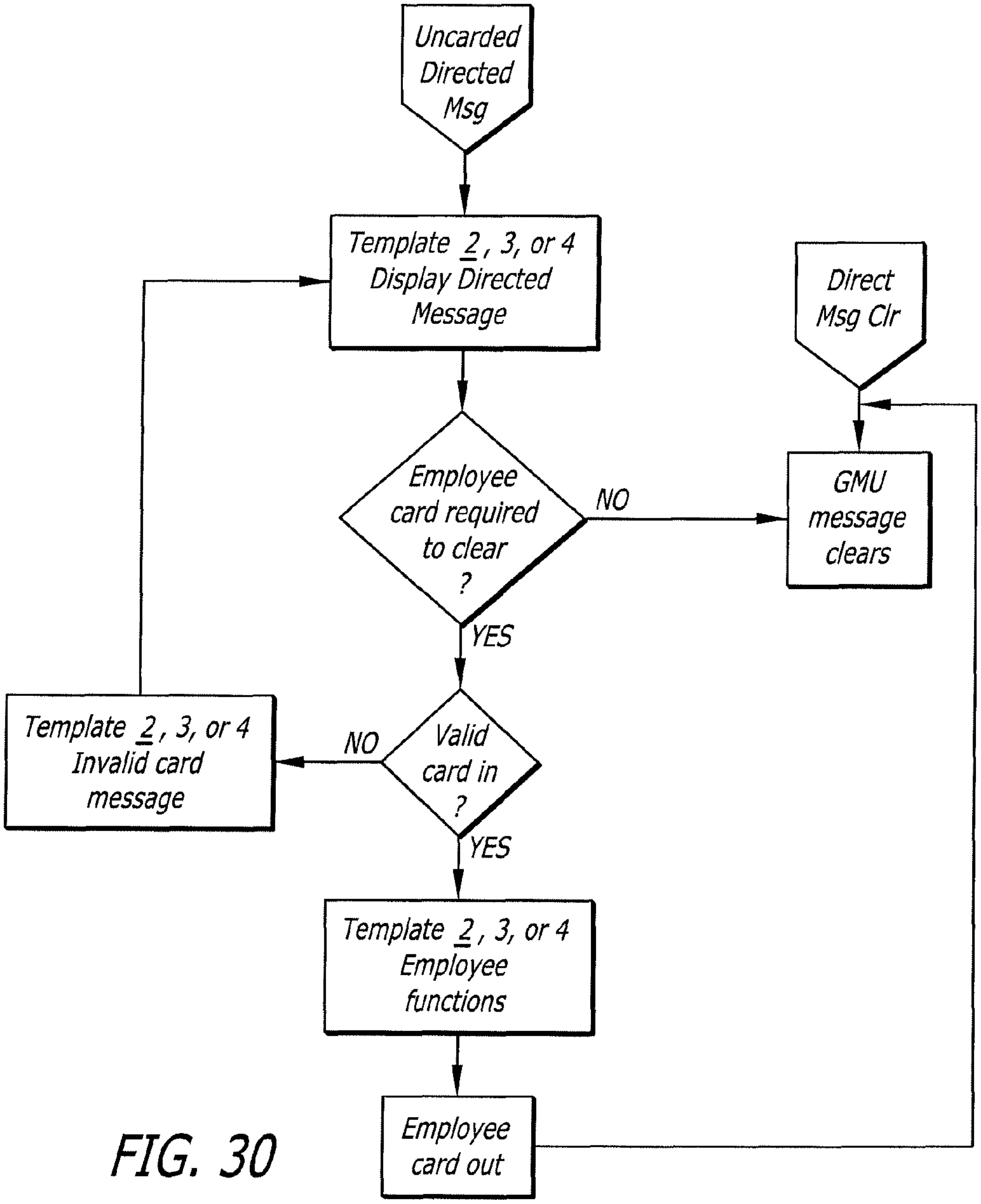
FIG. 30 is a logic flow diagram illustrating uncarded direct messages using the Display Manager system.
Figure 31:
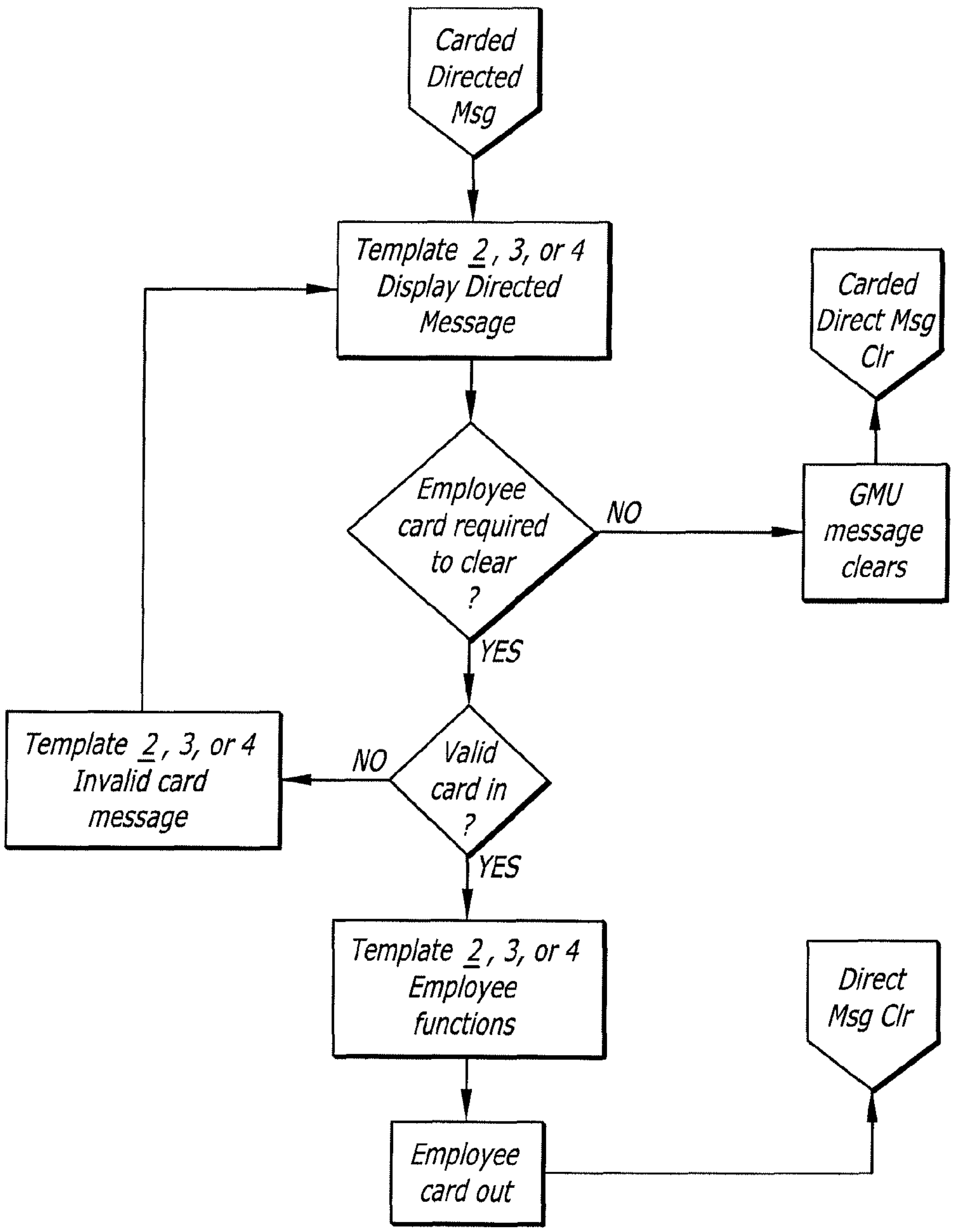
FIG. 31 is a logic flow diagram illustrating carded direct messages using the Display Manager system.

Referring now to FIG. 29, a logic flow diagram is shown of the Display Manager's basic functions. As shown in FIGS. 30 and 31, a logic flow diagram of uncarded direct messages using the Display Manager system is disclosed (FIG. 30) and a logic flow diagram of carded direct messages using the Display Manager system is disclosed (FIG. 31).

Figure 32:
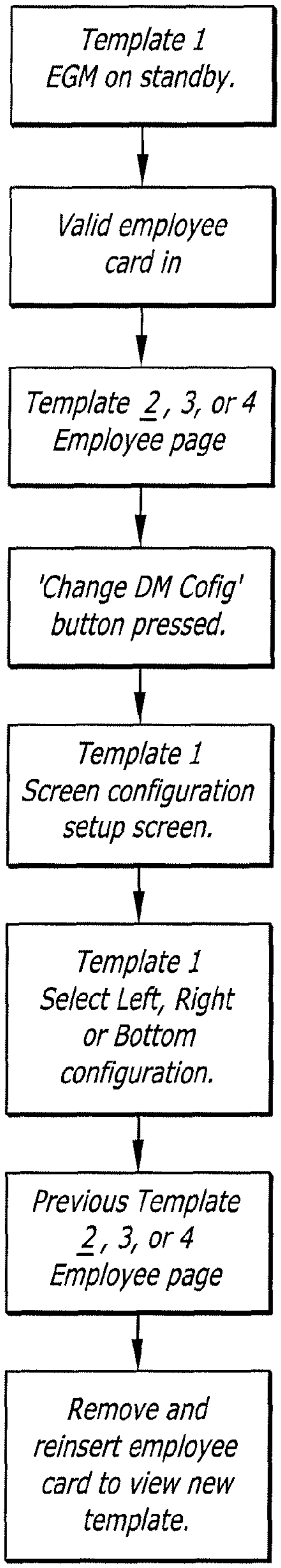
FIG. 32 is a logic flow diagram illustrating the additional Display Manager functions.
Figure 33:
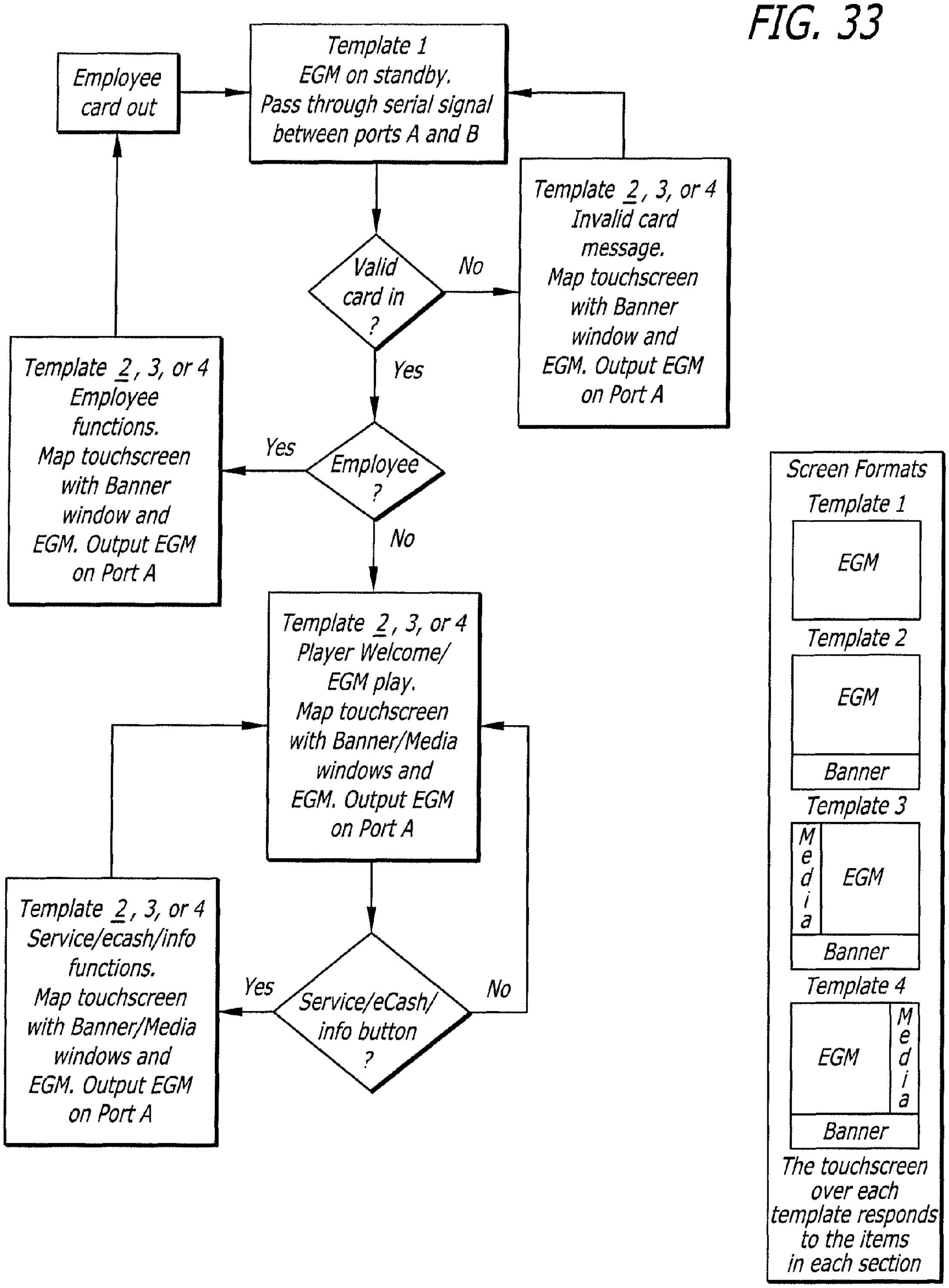
FIG. 33 is a logic flow diagram illustrating the additional serial touch screen functions.

Referring now to FIG. 32, a logic flow diagram is shown of the additional Display Manager functions. Additionally, with reference to FIG. 33, a logic flow diagram of the additional serial touch screen functions is disclosed.

One of ordinary skill in the art will appreciate that not all gaming systems and methods will have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A gaming system for presenting both gaming machine-based video signals and casino system-based video signals on a single display, the gaming system comprising:

a touch screen game display that displays video signals;

a gaming controller that generates gaming machine-based video signals;

a player tracking device that generates casino system-based video signals;

a touch router device in communication with the touch screen game display;

a display manager including a scaler chip in communication with the gaming controller, the player tracking device, and the touch screen game display, wherein the display manager receives a first video signal from the gaming controller and a second video signal from the player tracking device, and wherein the scaler chip of the display manager scales or shifts at least one of the first video signal or the second video signal to a reduced size and renders the first video signal from the gaming controller with the second video signal from the player tracking device; and a coordinate transformation calculation device that receives coordinates from an input on the touch screen game display which correspond to a determined source and accommodates any scaling or shifting performed on at least one of the first video signal or the second video signal, wherein the coordinate transformation calculation device determines transformed coordinates corresponding to the reduced size of the rendered video signal.

2. The system of claim 1, wherein the display manager simultaneously displays the first video signal from the gaming controller and the second video signal from the player tracking device on the touch screen game display.

3. The system of claim 2, wherein the display manager scales the touch screen game display to a reduced size and renders the first video signal from the gaming controller in a shifted position on the touch screen game display, enabling the second video signal from the player tracking device to be displayed adjacent to the first video signal that has been scaled and shifted on the touch screen game display.

4. The system of claim 2, wherein the display manager overlays the second video signal from the player tracking device on the first video signal from the gaming controller on the touch screen game display.

5. The system of claim 4, wherein the overlaid second video signal from the player tracking device obscures at least a portion of the first video signal from the gaming controller.

6. The system of claim 4, wherein the overlaid second video signal from the player tracking device includes a level of transparency enabling the first video signal from the gaming controller to be at least partially visible through the second video signal.

7. The system of claim 6, wherein the display manager overlays the second video signal from the player tracking device on the first video signal from the gaming controller with different levels of transparency in different areas of the touch screen game display.

8. The system of claim 1, wherein the display manager receives commands from at least one of the gaming controller and the player tracking device directing the display manager to simultaneously display the first and second video signals from the gaming controller and the player tracking device.

9. The system of claim 1, further comprising a secondary display in communication with the display manager, and wherein the display manager displays at least one of the first and second video signals from the gaming controller and player tracking device on the secondary display.

10. The system of claim 1, further comprising a game monitoring unit in communication with the gaming controller and the player tracking device.

11. A gaming system for presenting both game content-based video signals and secondary video signals on a single display, the gaming system comprising:

a touch screen game display that displays video signals;

a gaming controller generating a first video signal including game content to be viewed on the touch screen game display;

a secondary video source generating a second video signal including secondary content to be viewed on the touch screen game display;

a touch router device in communication with the touch screen game display;

a display manager including a scaler chip in communication with the gaming controller, the secondary video source, and the touch screen game display, wherein the display manager receives a first video signal from the gaming controller and a second video signal from the secondary video source, and wherein the scaler chip of the display manager scales at least one of the first video signal or the second video signal to a reduced size and renders the first video signal from the gaming controller with the second video signal from the secondary video source on the touch screen game display; and a coordinate transformation calculation device that receives coordinates from an input on the touch screen game display which correspond to a determined source and accommodates any scaling or shifting performed on at least one of the first video signal or the second video signal, wherein the coordinate transformation calculation device determines transformed coordinates corresponding to the reduced size of the rendered video signal.

12. The system of claim 11, wherein the display manager simultaneously displays the first video signal from the gaming controller and the second video signal from the secondary video source on the touch screen game display.

13. The system of claim 12, wherein the display manager scales the touch screen game display to a reduced size and renders the first video signal from the gaming controller in a shifted position on the touch screen game display, enabling the second video signal from the secondary video source to be displayed adjacent to the first video signal that has been scaled and shifted on the touch screen game display.

14. The system of claim 12, wherein the display manager overlays the second video signal from the secondary video source on the first video signal from the gaming controller on the touch screen game display.

15. The system of claim 14, wherein the overlaid second video signal from the secondary video source obscures at least a portion of the first video signal from the gaming controller.

16. The system of claim 14, wherein the overlaid second video signal from the secondary video source includes a level of transparency enabling the first video signal from the gaming controller to be at least partially visible through the second video signal.

17. The system of claim 16, wherein the display manager overlays the second video signal from the secondary video source on the first video signal from the gaming controller with different levels of transparency in different areas of the touch screen game display.

18. The system of claim 11, wherein the display manager receives commands from at least one of the gaming controller and the secondary video source directing the display manager to simultaneously display the first and second video signals from the gaming controller and the secondary video source.

19. The system of claim 11, further comprising a secondary display in communication with the display manager, and wherein the display manager displays at least one of the first and second video signals from the gaming controller and secondary video source on the secondary display.

20. The system of claim 11, further comprising a game monitoring unit in communication with the gaming controller and the secondary video source.

21. A gaming system for presenting both game content based video signals and secondary video signals on a single display, the gaming system comprising:

a touch screen game display that displays video signals;

a gaming controller generating a first video signal including game content to be viewed on the touch screen game display;

a secondary video source generating a second video signal including secondary content to be viewed on the touch screen game display;

a touch router device in communication with the touch screen game display;

a display manager including a scaler chip in communication with the gaming controller, the secondary video source, and the touch screen game display, wherein the display manager receives a first video signal from the gaming controller and a second video signal from the secondary video source, wherein the scaler chip of the display manager scales at least one of the first video signal or the second video signal to a reduced size and renders the first video signal from the gaming controller with the second video signal from the secondary video source on the touch screen game display; and a coordinate transformation calculation device that receives coordinates from an input on the touch screen game display which correspond to a determined source and accommodates any scaling or shifting performed on at least one of the first video signal or the second video signal, wherein the coordinate transformation calculation device determines transformed coordinates corresponding to the reduced size of the rendered video signal.

22. The system of claim 21, wherein the display manager simultaneously displays the first video signal from the gaming controller and the second video signal from the secondary video source on the touch screen game display.

23. The system of claim 22, wherein the display manager scales the touch screen game display to a reduced size and renders the first video signal from the gaming controller in a shifted position on the touch screen game display, enabling the second video signal from the secondary video source to be displayed adjacent to the first video signal that has been scaled and shifted on the touch screen game display.

24. The system of claim 22, wherein the display manager overlays the second video signal from the secondary video source on the first video signal from the gaming controller on the touch screen game display.

25. The system of claim 24 wherein the overlaid second video signal from the secondary video source obscures at least a portion of the first video signal from the gaming controller.

26. The system of claim 24, wherein the overlaid second video signal from the secondary video source includes a level of transparency enabling the first video signal from the gaming controller to be at least partially visible through the second video signal.

27. The system of claim 26, wherein the display manager overlays the second video signal from the secondary video source on the first video signal from the gaming controller with different levels of transparency in different areas of the touch screen game display.

28. The system of claim 21, wherein the display manager receives commands from at least one of the gaming controller and the secondary video source directing the display manager to simultaneously display the first and second video signals from the gaming controller and the secondary video source.

29. The system of claim 21, further comprising a secondary display in communication with the display manager, and wherein the display manager displays at least one of the first and second video signals from the gaming controller and secondary video source on the secondary display.

* * * * *